(12) United States Patent
Zhu et al.

(10) Patent No.: US 9,736,776 B2
(45) Date of Patent: *Aug. 15, 2017

(54) POWER SAVE METHOD, ACCESS POINT DEVICE, AND STATION DEVICE

(71) Applicant: Huawei Technologies Co., Ltd., Shenzhen (CN)

(72) Inventors: Hufei Zhu, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/066,939

(22) Filed: Mar. 10, 2016

(65) Prior Publication Data
US 2016/0205627 A1 Jul. 14, 2016

Related U.S. Application Data

(63) Continuation of application No. 14/502,730, filed on Sep. 30, 2014, now Pat. No. 9,313,737, which is a
(Continued)

(30) Foreign Application Priority Data

Feb. 1, 2011 (CN) .......................... 2011 1 0034355
Feb. 25, 2011 (CN) .......................... 2011 1 0046716
(Continued)

(51) Int. Cl.
*H04W 52/02* (2009.01)
*H04B 7/0452* (2017.01)
(Continued)

(52) U.S. Cl.
CPC ...... *H04W 52/0222* (2013.01); *H04B 7/0452* (2013.01); *H04W 52/0209* (2013.01);
(Continued)

(58) Field of Classification Search
CPC . H04W 52/02; H04W 52/0203; H04W 84/12; H04W 52/46; H04W 7/1854
(Continued)

(56) References Cited

U.S. PATENT DOCUMENTS 7,570,613 B2    8/2009  Benveniste
7,783,329 B2    8/2010  Kim et al.
(Continued)

FOREIGN PATENT DOCUMENTS

CN       1866948 A    11/2006
CN     101584229 A    11/2009
(Continued)

OTHER PUBLICATIONS

IEEE802.11-11/0091r0, Downlink TXOP Power Save, Jan. 17, 2011 (11-11-0091-00-00ac-dl-txop-ps-protocol).*
(Continued)

Primary Examiner — Warner Wong
(74) Attorney, Agent, or Firm — Leydig, Voit & Mayer, Ltd.

(57) ABSTRACT

A power save method, an AP device and an STA device are provided. According to whether power save is allowed in a current TXOP and whether a station STA is newly added in an operation object identifier of a subsequent frame of each frame of the current TXOP, the AP device respectively sets a TXOP power save indication of each frame, and when the TXOP power save indication of the current frame is power save allowed, the STA device determines whether to enter the Doze state according to a judgment result for a doze condition. The adoption of the method and the device can expand the power save application range, and enhance the power save effect.

12 Claims, 8 Drawing Sheets

Related U.S. Application Data continuation of application No. 13/466,567, filed on May 8, 2012, now Pat. No. 9,226,238, which is a continuation of application No. PCT/CN2011/082357, filed on Nov. 17, 2011.

(30) Foreign Application Priority Data

| | | |
|---|---|---|
| Mar. 16, 2011 | (CN) | 2011 1 0063511 |
| May 12, 2011 | (CN) | 2011 1 0122719 |
| Jun. 16, 2011 | (CN) | 2011 1 0162550 |

(51) Int. Cl.
  *H04W 88/02* (2009.01)
  *H04W 88/08* (2009.01)
  *H04W 52/46* (2009.01)

(52) U.S. Cl.
  CPC ... *H04W 52/0212* (2013.01); *H04W 52/0216* (2013.01); *H04W 52/0235* (2013.01); *H04W 52/46* (2013.01); *H04W 88/02* (2013.01); *H04W 88/08* (2013.01); *Y02B 60/50* (2013.01)

(58) Field of Classification Search
  USPC ................................................ 370/310–350
  See application file for complete search history.

(56) References Cited

U.S. PATENT DOCUMENTS

| | | |
|---|---|---|
| 8,355,716 B2 | 1/2013 | Shimizu |
| 8,611,267 B2 | 12/2013 | Kwon et al. |
| 8,634,336 B2 | 1/2014 | Kang et al. |
| 8,644,281 B2 | 2/2014 | Seok et al. |
| 8,681,675 B2 | 3/2014 | Kim et al. |
| 2004/0218556 A1 | 11/2004 | Son et al. |
| 2005/0009578 A1 | 1/2005 | Liu |
| 2005/0018624 A1 | 1/2005 | Meier et al. |
| 2005/0221847 A1 | 10/2005 | Brehler et al. |
| 2006/0252443 A1 | 11/2006 | Sammour et al. |
| 2006/0285526 A1 | 12/2006 | Jang et al. |
| 2007/0004374 A1 | 1/2007 | Kneckt |
| 2007/0161364 A1 | 7/2007 | Surineni et al. |
| 2007/0171858 A1 | 7/2007 | Grandhi et al. |
| 2007/0248117 A1 | 10/2007 | Zuniga et al. |
| 2008/0095091 A1 | 4/2008 | Surineni et al. |
| 2009/0238210 A1 | 9/2009 | Myers et al. |
| 2009/0279464 A1 | 11/2009 | Kakani et al. |
| 2010/0008276 A1 | 1/2010 | Kopikare et al. |
| 2010/0118753 A1 | 5/2010 | Mandin et al. |
| 2010/0271995 A1 | 10/2010 | Seok et al. |
| 2011/0194644 A1 | 8/2011 | Liu et al. |
| 2011/0222453 A1 | 9/2011 | Kwon et al. |
| 2011/0249605 A1 | 10/2011 | Kwon et al. |
| 2011/0261742 A1 | 10/2011 | Wentink |
| 2012/0014305 A1 | 1/2012 | Kakani et al. |
| 2012/0027000 A1 | 2/2012 | Wentink |
| 2012/0087358 A1 | 4/2012 | Zhu et al. |
| 2012/0182886 A1 | 7/2012 | Ong et al. |
| 2012/0188923 A1 | 7/2012 | Kwon et al. |
| 2012/0218927 A1 | 8/2012 | Hsieh |
| 2012/0218982 A1* | 8/2012 | Lee ................... H04L 1/0009 370/338 |
| 2012/0224521 A1 | 9/2012 | Zhu et al. |
| 2013/0010664 A1* | 1/2013 | Kang ................. H04B 7/0452 370/311 |
| 2013/0077613 A1 | 3/2013 | Grandhi et al. |
| 2013/0142115 A1* | 6/2013 | Yu ..................... H04W 56/00 370/328 |
| 2013/0329620 A1* | 12/2013 | Kim ................. H04W 52/0229 370/311 |
| 2014/0022973 A1 | 1/2014 | Kopikare et al. |
| 2014/0112230 A1 | 4/2014 | Sammour et al. |
| 2014/0185507 A1 | 7/2014 | Kim et al. |
| 2015/0156721 A1* | 6/2015 | Kim ................. H04W 52/0216 370/311 |
| 2015/0163742 A1* | 6/2015 | Kwon ............... H04W 52/0235 370/311 |
| 2015/0195853 A1 | 7/2015 | Vleugels et al. |
| 2016/0044533 A1* | 2/2016 | Seok ..................... H04L 5/0007 370/330 |
| 2016/0057657 A1* | 2/2016 | Seok ..................... H04L 69/324 370/476 |

FOREIGN PATENT DOCUMENTS

| | | | |
|---|---|---|---|
| CN | 101668044 A | 3/2010 | |
| CN | 102017732 A | 4/2011 | |
| CN | 102090115 A | 6/2011 | |
| CN | 102625422 A | 8/2012 | |
| CN | 102625424 A | 8/2012 | |
| EP | 2170009 A1 | 3/2010 | |
| EP | 2304992 A1 | 4/2011 | |
| JP | 2009509469 A | 3/2009 | |
| JP | 2013522947 A | 6/2012 | |
| JP | 2013513285 A | 4/2013 | |
| JP | 2013524777 A | 6/2013 | |
| JP | 2013528962 A | 7/2013 | |
| JP | 2013535935 A | 9/2013 | |
| KR | 20060131049 A | 12/2006 | |
| RU | 2371846 C2 | 5/2008 | |
| RU | 2006138502 A | 5/2008 | |
| RU | 2008131951 A | 2/2010 | |
| RU | 2009118607 A | 11/2010 | |
| WO | WO 2005099107 A1 | 10/2005 | |
| WO | WO 2006115999 A2 | 11/2006 | |
| WO | 2007082235 A1 | 7/2007 | |
| WO | WO 2010006142 A1 | 1/2010 | |
| WO | WO 2011112000 A2 | 9/2011 | |
| WO | WO 2011112006 A2 | 9/2011 | |
| WO | WO 2012023743 A2 | 2/2012 | |
| WO | WO 2012046951 A1 | 4/2012 | |

OTHER PUBLICATIONS

U.S. Appl. No. 14/502,730, filed Sep. 30, 2014.
U.S. Appl. No. 13/466,567, filed May 8, 2012.
Corrected Notice of Allowance in corresponding U.S. Appl. No. 13/466,567 (Sep. 22, 2015).
"IEEE Standard for Information technology—Telecommunications and information exchange between systems Local and metropolitan area networks; Specific requirements; Part 11: Wireless LAN Medium Access Control (MAC) and Physical Layer (PHY) Specifications; Amendment 4: Enhancements for Very High Throughput for Operation in Bands below 6 GHz," IEEE Std 802.11ac-2013, pp. i-395, Institute of Electrical and Electronics Engineers, New York, New York (Dec. 11, 2013).
"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 8: Medium Access Control (MAC) Quality of Service Enhancements," IEEE Std 802.11 e-2005, pp. i-189, Institute of Electrical and Electronics Engineers, New York, New York (Nov. 11, 2005).
"IEEE Standard for Information technology—Telecommunications and information exchange between systems—Local and metropolitan area networks—Specific CH requirements; Part 11: Wireless LAN Medium Access Control (MAC) and Physical Layer (PHY) Specifications," IEEE Std 802.11-1999, pp. i-512, Institute of Electrical and Electronics Engineers, New York, New York (Aug. 20, 1999).
Sandhya et al., "Downlink TXOP Power Save," IEEE 802.11-11/0091r0, pp. 1-9, Institute of Electrical and Electronics Engineers, New York, New York (Jan. 17, 2011).
Sandhya et al., "DL MU TXOP Power Save," IEEE 802.11-10/1302r0, pp. 1-15, Institute of Electrical and Electronics Engineers, New York, New York (Nov. 7, 2010).

(56) References Cited

OTHER PUBLICATIONS

Office Action in corresponding U.S. Appl. No. 13/466,567(May 12, 2014).
Notice of Allowance in corresponding U.S. Appl. No. 13/466,567 (Sep. 30, 2014).
$1^{st}$ Office Action in corresponding U.S. Appl. No. 14/502,730 (Jul. 27, 2015).
$2^{nd}$ Office Action in corresponding U.S. Appl. No. 14/502,730 (Oct. 8, 2015).

* cited by examiner

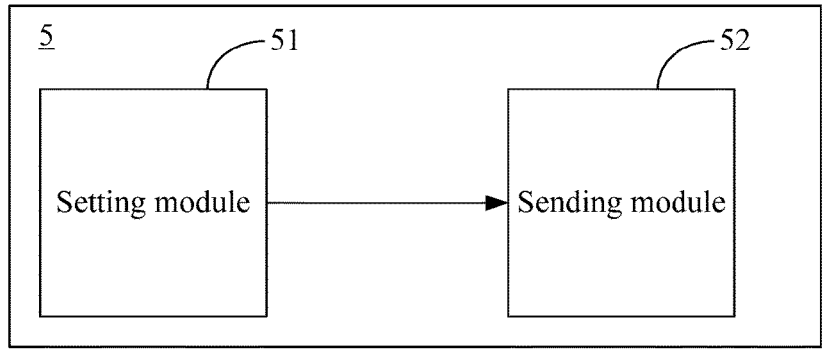

FIG. 5

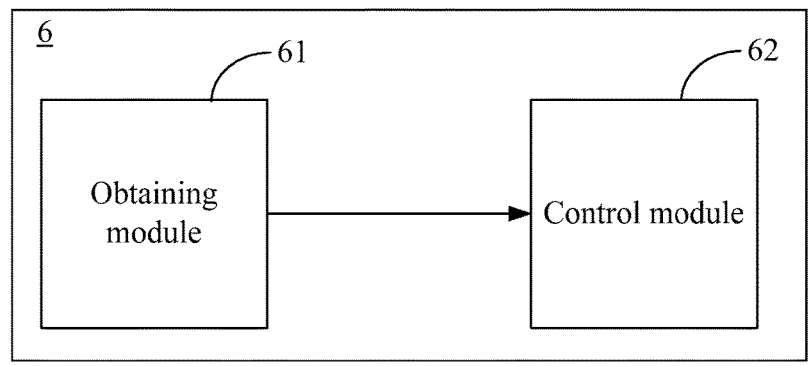

FIG. 6

| An STA device respectively obtains a current frame and a preset frame of a current TXOP, in which the current frame includes a subsequent STA indication and a TXOP power save indication, and the preset frame includes an operation object identifier | 701 |

| When the TXOP power save indication of the current frame is allowed, the operation object identifier of the preset frame does not include an indication for this STA device, and the subsequent STA indication of the current frame is that no STA is newly added subsequently, the STA device enters a doze state | 702 |

FIG. 7

POWER SAVE METHOD, ACCESS POINT DEVICE, AND STATION DEVICE

CROSS-REFERENCE TO RELATED APPLICATIONS

This application is a continuation of U.S. patent application Ser. No. 14/502,730, filed Sep. 30, 2014, which is a continuation of U.S. patent application Ser. No. 13/466,567, filed May 8, 2012, now U.S. Pat. No. 9,226,238, which is a continuation of International Patent Application No. PCT/CN2011/082357, filed Nov. 17, 2011, which claims priority to Chinese Patent Application No. 201110034355.9, filed Feb. 1, 2011, Chinese Patent Application No. 201110046716.1, filed Feb. 25, 2011, Chinese Patent Application No. 201110063511.4, filed Mar. 16, 2011, Chinese Patent Application No. 201110122719.9, filed May 12, 2011, and Chinese Patent Application No. 201110162550.X, filed Jun. 16, 2011, all of which are incorporated herein by reference in their entireties.

FIELD OF THE INVENTION

The present invention relates to wireless communication technologies, and in particular, to a power save method, an access point (Access Point, AP for short) device, and a station (Station, STA for short) device.

BACKGROUND OF THE INVENTION

For a multiple-input multiple-output (Multiple-Input Multiple-Output, MIMO for short) wireless communication system, in a transmit opportunity (Transmit Opportunity, TXOP for short), not all STA devices in a basic service set (Basic Service Set, BSS for short) need to receive data. Therefore, in a wireless communication system, a power save method is adopted, to enable an STA device receiving no data in the current TXOP to enter a Doze state. The STA device in the Doze state disables its own receiver, thereby reducing power consumption.

Currently, a power save method for a wireless communication system is that: an AP device sends an operation object identifier and a no TXOP power save indication (No TXOP Power Save indication, No TXOP PS indication for short) to an STA device. The operation object identifier is used for indicating one or more STA devices which need to perform an operation. The no TXOP power save indication may be yes or no, in which, if the no TXOP power save indication is no, it indicates that an STA device in this BSS is allowed to perform a power save operation in the current TXOP; if the no TXOP power save indication is yes, it indicates that the STA device in this BSS is forbidden to perform the power save operation in the current TXOP. An effective interval indicated by the no TXOP power save indication is the current TXOP, and therefore, if the STA device enters the Doze state, the STA device maintains the Doze state until this TXOP ends, and when this TXOP ends, the STA device is restored to an Awake state. In a power save method of current communication standards, No TXOP PS of all frames of the same TXOP is set to the same value, and the STA device having a function of entering the Doze state performs judgment only according to No TXOP PS of a first frame of a TXOP. Specifically, in a TXOP, after receiving the first frame, the STA device having the function of entering the Doze state judges whether power save is allowed to be performed in this TXOP according to the No TXOP PS of the first frame. If it is not allowed, the foregoing STA device maintains the Awake state in the entire TXOP. If it is allowed, the foregoing the STA device judges whether to enter the Doze state according to a doze condition in all frames from the first frame to a last frame of this TXOP.

It is well-known that, the STA having the function of entering the Doze state refers to that the STA supports the function of entering the Doze state and the function is in an enabling state. The STA supporting the function of entering the Doze state may enable this function in a period of time, and disables this function in other period of time; that is, the STA may have the function of entering the Doze state in a period of time, and have no function of entering the Doze state in other period of time. Corresponding signaling in the prior art enables an STA to report information about whether the STA currently has the function of entering the Doze state to an AP. The existing power save method is adopted, and when no TXOP power save indication carried in the first frame of TXOP is no, it indicates that all STA devices in the BSS which are not included in the operation object identifier of the frame may enter the Doze state; in this case, generally all the STA devices in the BSS having the function of entering the Doze state perform judgment according to the doze condition, and if the doze condition is satisfied, the STA devices enter the Doze state. Therefore, for a multi-user MIMO (Multi-User MIMO, MU-MIMO for short) mode, the adopted existing power save method is only applicable to a case that the operation object identifier in the first frame of TXOP includes all the STA devices having the function of entering the Doze state related to the TXOP, and for a single-user MIMO (Single-User MIMO, SU-MIMO for short) mode, the method is only applicable to a case that an operation object identifier of each frame of the TXOP only indicates not more than one STA device having the function of entering the Doze state, so that power can be saved only under a few situations, the application range is small, and therefore the power save effect is undesirable.

SUMMARY OF THE INVENTION

Embodiments of the present invention provide a power save method, an AP device and an STA device, which are used for solving drawbacks in the prior art, expanding the power save application range, and enhancing the power save effect.

An embodiment of the present invention provides a power save method, which includes:

according to whether power save is allowed in a current transmit opportunity TXOP and whether an identifier of a station STA is newly added in an operation object identifier of a subsequent frame of each frame of the current TXOP, setting a TXOP power save indication of each frame, in which the STA is an STA having the function of entering the Doze state; and sending one or more frames of the current TXOP to the STA device, so that when the TXOP power save indication of the current frame indicates that power save is allowed, the STA device determines whether to enter the Doze state according to a judgment result for a doze condition, in which the STA device is an STA device having the function of entering the Doze state.

An embodiment of the present invention provides a power save method, which includes:

obtaining a current frame of a current TXOP, in which the current frame includes a TXOP power save indication set by an AP device according to whether power save is allowed in the current TXOP and whether an identifier of a station STA is newly added in an operation object identifier of a subsequent frame, and the STA is an STA having the function of entering the Doze state; and when the TXOP power save indication of the current frame indicates that power save is allowed, determining, by the STA device, whether to enter the Doze state according to a judgment result for a doze condition, in which the STA device is an STA device having the function of entering the Doze state.

An embodiment of the present invention further provides an AP device, which includes:

a setting module, configured to, according to whether power save is allowed in a current transmit opportunity TXOP and whether an identifier of a station STA is newly added in an operation object identifier of a subsequent frame of each frame of the current TXOP, respectively set a TXOP power save indication of each frame, in which the STA is an STA having the function of entering the Doze state; and a sending module, configured to send one or more frames of the current TXOP to the STA device, so that when the TXOP power save indication of the current frame indicates that power save is allowed, the STA device determines whether to enter the Doze state according to a judgment result for a doze condition, in which the STA device is an STA device having the function of entering the Doze state.

An embodiment of the present invention further provides an STA device, in which the STA device is an STA device having a function of entering a Doze state, and includes:

an obtaining module, configured to obtain a current frame of a current transmit opportunity TXOP, in which the current frame includes a TXOP power save indication set by an access point AP device according to whether power save is allowed in the current TXOP and whether an identifier of a station STA is newly added in an operation object identifier of a subsequent frame, in which the STA is an STA having the function of entering the Doze state; and a control module, configured to, when the TXOP power save indication of the current frame indicates that power save is allowed, control the STA device to determine whether to enter the Doze state according to a judgment result for a doze condition.

An embodiment of the present invention further provides a power save method, which includes:

respectively obtaining, by a station STA device, a current frame and a preset frame of a current transmit opportunity TXOP, in which the current frame includes a subsequent terminal STA indication and a TXOP power save indication, and the preset frame includes an operation object identifier;

when the TXOP power save indication of the current frame is allowed, the operation object identifier of the preset frame does not include an indication for this STA device, and the subsequent STA indication of the current frame is that no identifier of a station STA is newly added subsequently, entering, by the STA device, a Doze state, in which the STA is an STA having the function of entering the Doze state; and the STA device is an STA device having the function of entering the Doze state.

An embodiment of the present invention further provides an STA device, in which the STA device is an STA device having a function of entering a Doze state, and includes:

an obtaining module, configured to respectively obtain a current frame and a preset frame of a current transmit opportunity TXOP, in which the current frame includes a subsequent STA indication and a TXOP power save indication, and the preset frame includes an operation object identifier;

a control module, configured to, when the TXOP power save indication of the current frame is allowed, the operation object identifier of the preset frame does not include an indication for this STA device, and the subsequent STA indication of the current frame is that no identifier of a station STA is newly added subsequently, control the STA device to enter a Doze state, in which the STA is an STA having the function of entering the Doze state.

A power save method includes:

setting a power save indication of a current data frame, in which the power save indication is used for indicating that an STA receiving the current data frame is capable of allowing power save;

sending the current data frame in a current transmit opportunity TXOP, so that the STA receiving the current data frame determines whether to enter a Doze state according to a judgment result for a doze condition, and a power save indication included at least one data frame sent before the current data frame is sent in the TXOP is used for indicating that the STA is forbidden from performing power save, in which the STA device is an STA device having the function of entering the Doze state.

An access point device, with a function of entering a Doze state, includes:

a setting unit, configured to set a power save indication of a current data frame, in which the power save indication is used for indicating that an STA receiving the current data frame is capable of allowing power save;

a sending unit, configured to send the current data frame in a current transmit opportunity TXOP, so that the STA receiving the current data frame determines whether to enter a Doze state according to a judgment result for a doze condition, in which, the setting unit sets the current frame so that a power save indication included at least one data frame sent before the current data frame is sent in the TXOP is used for indicating power save forbidden.

It can be known from the technical solutions that, according to the embodiments of the present invention, TXOP power save indications of different frames in the same TXOP may be different, and only when two conditions that no identifier of a station STA is newly added and power save is allowed in the current TXOP are both satisfied, a TXOP power save indication of the frame or a subsequent frame of the frame indicates power save allowed; only when the TXOP power save indication of the current frame indicates that power save is allowed, an STA judges a doze condition, and determines whether to enter the Doze state according to a judgment result. Alternatively, the AP device sends a subsequent STA indication to the STA device, and when the TXOP power save indication is allowed, the subsequent STA indication is that no identifier of a station STA is newly added subsequently and the operation object identifier of the preset frame does not include an identifier of this STA device, the STA device enters the Doze state. Therefore, the method does not require the operation object identifier in the first frame of the TXOP to include all STA devices related to the TXOP, thereby expanding the application range of the power save method, and enhancing the power save effect.

BRIEF DESCRIPTION OF THE DRAWINGS

FIG. 5 is a schematic structural diagram of an AP device according to embodiment 5 of the present invention;

FIG. 6 is a schematic structural diagram of an STA device according to embodiment 6 of the present invention;

FIG. 7 is a flowchart of a power save method according to embodiment 7 of the present invention;

DETAILED DESCRIPTION OF THE EMBODIMENTS

Figure 1:
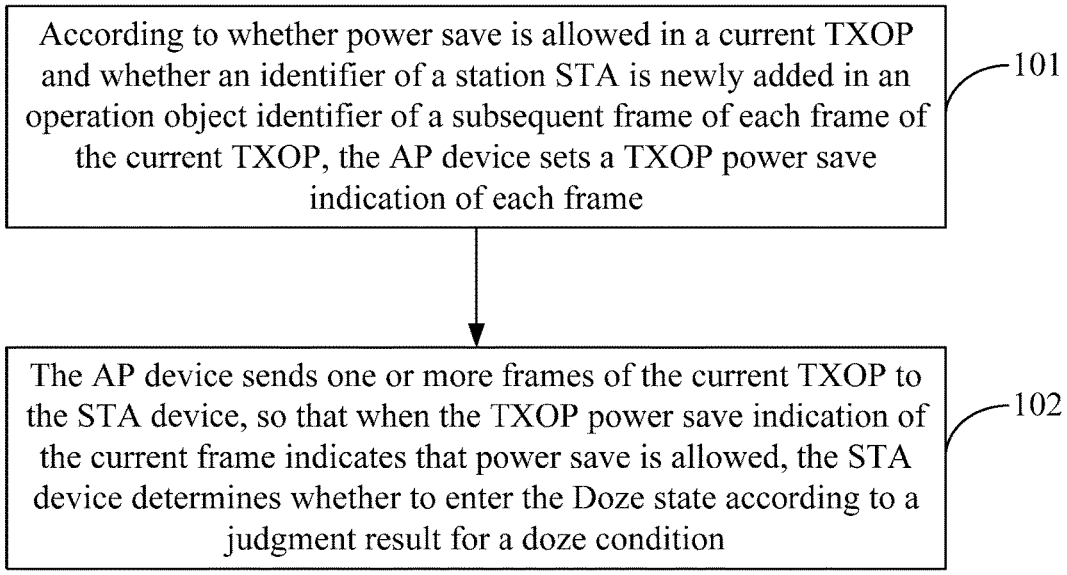
FIG. 1 is a flowchart of a power save method according to embodiment 1 of the present invention.

When a No TXOP PS indication indicates that power save is allowed, a doze condition used for judging whether to enter a Doze state may include any one or any combination of three conditions, and when one of the conditions is satisfied, it is judged that the doze condition is satisfied, in such case, an STA device enters the Doze state; when one or more conditions included by the doze condition are unsatisfied, it is judged that the doze condition is unsatisfied, in such case, the STA device maintains an Awake state.

It should be further noted that, when a No TXOP PS indication indicates that power save is allowed, a doze condition used for judging whether to enter a Doze state may include any one or any combination of three conditions, and when one of the conditions is satisfied, it is judged that the doze condition is satisfied, in such case, an STA device enters the Doze state; when one or more conditions included by the doze condition are unsatisfied, it is judged that the doze condition is unsatisfied, in such case, the STA device having the function of entering the Doze state maintains the Awake state; if the STA device does not support the ability to enter the Doze state, the STA device always maintains the Awake state, and the foregoing doze condition does not need to be judged. For ease of description, the STA in the following description that "the STA device enters the Doze state" refers to an STA having the function of entering the Doze state; that is, that "the STA device enters the Doze state" definitely implicitly illustrates that the STA is an STA having the function of entering the Doze state.

Specifically, in MU-MIMO mode, the three conditions specifically include the following content. Condition 1: when an operation object identifier of a preset frame does not include an indication for the STA device which received the preset frame, the STA device enters the Doze state. Condition 2: when an operation object identifier of a preset frame includes an indication for the STA device, and an indication of a spatial multiplexing stream number corresponding to the STA is 0, the STA device enters the Doze state. Condition 3: when an operation object identifier of a preset frame includes an indication for the STA device, and the STA receives more data frames whose data bit indications are 0, the STA device enters the Doze state. In SU-MIMO mode, the three conditions specifically include the following content. Condition 1: when a partial association identifier (association identifier, AID for short) indicated in the operation object identifier of the preset frame is different from a partial AID of the STA device which received the preset frame, the STA device enters the Doze state. Condition 2: when the partial AID indicated in the operation object identifier of the preset frame is the same as the partial AID of the STA device, but the current frame is not sent to the STA, the STA device enters the Doze state. Condition 3: when an operation object identifier of a preset frame includes an indication for the STA device, and the STA receives more data frames whose data bit indications are 0, the STA device enters the Doze state.

If an existing power save method is adopted, No TXOP PS of each frame in the same TXOP is completely the same. For the MU-MIMO mode, when the No TXOP PS indication of the first frame indicates that power save is allowed, and if an STA device not included in the first frame is related in the operation object identifier of a subsequent frame of the TXOP, and because the STA device has entered the Doze state after receiving the first frame, an indication of the subsequent frame cannot be responded. However, for the SU-MIMO mode, when the No TXOP PS indication of the first frame indicates that power save is allowed, and if the STA device indicated by the subsequent frame of the TXOP is different from the STA device indicated by the first frame, and because the STA device indicated by the subsequent frame has entered the Doze state after receiving the first frame, an indication of the subsequent frame cannot be responded.

With respect to the foregoing drawback, an embodiment of the present invention proposes a power save method, and in the same TXOP, different No TXOP PS may be set for different frames; specifically, according to whether a communication system where an AP is located allows power save in the current TXOP and whether an identifier of a station STA is newly added in the subsequent frame of the TXOP, the AP sets No TXOP PS of each frame, and the STA judges whether to enter the Doze state according to the No TXOP PS. For details, refer to the following embodiment 1 to embodiment 6.

It should be noted that, in the following embodiments of the present invention, the STA is an STA having the function of entering the Doze state; and in the embodiments of the present invention, the STA device is an STA device having the function of entering the Doze state. However, as described above, the STA device having no function of entering the Doze state always maintains the Awake state, does not need to judge whether it can enter the Doze state according to the doze condition, and correspondingly does not need to adopt the method of the present invention to enhance the effect of entering the Doze state to save power.

Further, it can be known according to the description of the foregoing background technology that:

the STA being the STA having the function of entering the Doze state includes: the STA is an STA having a function of entering the Doze state and maintaining the Doze state until the current TXOP ends; and the STA device being the STA device having the function of entering the Doze state includes: the STA device is an STA device having a function of entering the Doze state and maintaining the Doze state until the current TXOP ends.

That is, when the STA device decides to enter the Doze state, the STA device enters the Doze state, and maintains the Doze state until the current TXOP ends. In the following embodiments, that the STA device enters the Doze state is the meaning.

FIG. 1 is a flowchart of a power save method according to embodiment 1 of the present invention. In embodiment 1 of the present invention, an operating process of an AP device is taken as an example to illustrate the power save method. As shown in FIG. 1, the method includes the following procedure.

Step 101: According to whether power save is allowed in a current TXOP and whether an identifier of a station STA is newly added in an operation object identifier of a subsequent frame of each frame of the current TXOP, the AP device sets a TXOP power save indication of each frame.

Step 102: The AP device sends one or more frames of the current TXOP to the STA device, so that when the TXOP power save indication of the current frame indicates that power save is allowed, the STA device determines whether to enter the Doze state according to a judgment result for a doze condition.

In this step, each frame includes: an operation object identifier of the frame and a TXOP power save indication of the frame.

On the basis of the foregoing technical solution, a specific method for step 101 is further introduced. In the same TXOP, the TXOP power save indication of each frame is respectively set by the AP according to whether power save is allowed in the current TXOP and whether an identifier of a station STA is newly added in an operation object identifier of the subsequent frame of each frame of the current TXOP. Specifically, the AP may adopt two methods to judge whether an identifier of a station STA is newly added in an operation object identifier of the subsequent frame of each frame of the current TXOP. A first method is that: t is judged whether the operation object identifiers of the current frame and a frame before the current frame indicate an STA device required to transfer data in all frames after the current frame in the current TXOP, and if yes, it indicates that a new STA device is not indicated in each of subsequent frames of the current frame, the condition that no identifier of a station STA is newly added subsequently is satisfied; otherwise, the condition that no identifier of a station STA is newly added subsequently is unsatisfied. A second method is that: it is judged whether the operation object identifier of the current frame indicates an STA device required to transfer data in all frames after the current frame in the current TXOP, and if yes, it indicates that a new STA device is not indicated in each of subsequent frames of the current frame, the condition that no identifier of a station STA is newly added subsequently is satisfied; otherwise, the condition that no identifier of a station STA is newly added subsequently is unsatisfied. Any one of the foregoing methods is adopted to judge whether an identifier of a station STA is newly added subsequently, and a method for setting the TXOP power save indication is that: when no identifier of a station STA is newly added subsequently and power save is allowed in the current TXOP, the TXOP power save indication of the current frame of the current TXOP may be set to power save allowed; or, the TXOP power save indication of the current frame of the current TXOP may also be set to power save forbidden, and the TXOP power save indication of any frame after the current frame is set to power save allowed. When an identifier of a station STA is newly added subsequently, the TXOP power save indication of the current frame may be set to power save forbidden, that is, no matter whether power save is allowed in the current TXOP, as long as an identifier of a station STA is newly added subsequently, the TXOP power save indication of the current frame may be set to power save forbidden; and, when power save is not allowed in the current TXOP, no matter whether an identifier of a station STA is newly added subsequently, the TXOP power save indication of the current frame may be set to power save forbidden.

In embodiment 1 of the present invention, the AP device may adopt different settings for TXOP power save indications of different frames in the same TXOP, so that it is possible to set some frames in a TXOP to power save allowed, and the STA device may enter the Doze state in the frames; and the rest of the frames in the same TXOP is set to power save forbidden, and the STA device may maintain the Awake state in the frames. Only when two conditions that no identifier of a station STA is newly added and power save is allowed are both satisfied, the AP device sets the TXOP power save indication of a frame or a subsequent frame of the frame to power save allowed, so that the STA device determines whether to judge the doze condition according to the TXOP power save indication. Because different TXOP power save indications are set for different frames, and if the operation object identifier of the first frame does not include all STA devices related to the TXOP, the AP device may set the TXOP power save indication of the first frame to power save forbidden, and until operation object identifiers of multiple frames from the first frame to the current frame have included all STA devices related to the TXOP, the TXOP power save indication of the current frame is set to power save allowed, and therefore the method is still applicable to a case that the operation object identifier in the first frame of the TXOP does not include all STA devices related to the TXOP, thereby expanding the power save application range. Furthermore, in the case that the operation object identifier in the first frame of the TXOP does not include all STA devices related to the TXOP, power save cannot be performed in the TXOP all along by using the existing power save method, and if the power save method of embodiment 1 of the present invention is adopted, the AP sets the TXOP power save indication of the first frame to power save forbidden, each STA device does not enter the Doze state after receiving the first frame, and until a frame where the TXOP power save indication indicates that power save is allowed, is received, each STA device judges whether to enter the Doze state according to the doze condition, thereby enhancing the power save effect.

It should be noted that, the foregoing STA newly added subsequently refers to an STA having the function of entering the Doze state; a case that the present invention needs to avoid is that: if the STA having the function of entering the Doze state enters the Doze state in the current frame, the STA cannot receive data to be sent to the STA itself in a subsequent frame of the current frame in the TXOP, thereby resulting in decrease of communication performance. Accordingly, the embodiment of the present invention needs to indicate whether an identifier of a station STA having the function of entering the Doze state is newly added subsequently (that is, in a subsequent frame of the current frame in the TXOP) in the current frame, thereby ensuring that the STA that has the function of entering the Doze state and is newly added subsequently does not enter the Doze state in the current frame according to the indication, and therefore may receive the data to be sent to the STA itself in the current frame. However, whether an STA having the function of entering the Doze state is newly added subsequently does not result in the foregoing case that the present invention needs to avoid, and therefore, the embodiment of the present invention does not need to indicate whether an identifier of a station STA having the function of entering the Doze state is newly added subsequently in the current frame, and the setting of each bit relevant to the indication about whether an identifier of a station STA is newly added subsequently in the above description and the following description of the present invention is not influenced.

In step 102, the AP device sends one or more frames of the current TXOP to the STA device, so that when the TXOP power save indication of the current frame indicates that power save is allowed, the STA device determines whether to enter the Doze state according to a judgment result for a doze condition. It is easily understood that, here, the determining whether to enter the Doze state may be determining whether to be capable of entering the Doze state in an embodiment.

It is easily understood that, as described in step 102, if the TXOP power save indication of the current frame indicates that power save is allowed, the STA device determines to enter the Doze state according to a judgment result for a doze condition, and in an embodiment, the STA device may enter the Doze state in the current frame; in another embodiment, the STA device may not enter the Doze state in the current frame, but enters the Doze state until a present number of frames reaches.

Additionally, as described above, when the STA device decides to enter the Doze state, the STA device enters the Doze state, and maintains the Doze state until the current TXOP ends. In the following embodiments, that the STA device enters the Doze state is this meaning.

Figure 2:
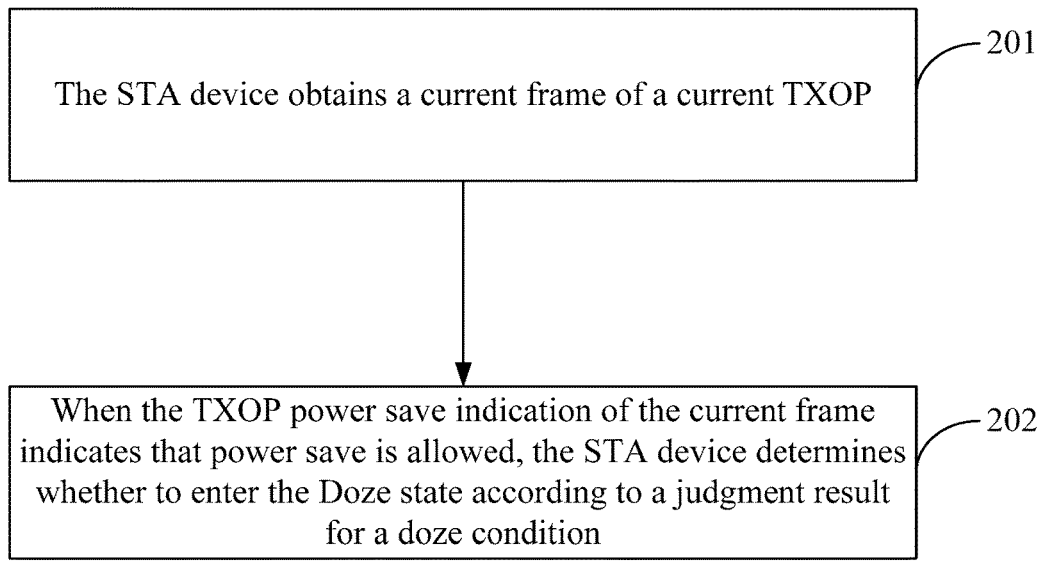
FIG. 2 is a flowchart of a power save method according to embodiment 2 of the present invention.

FIG. 2 is a flowchart of a power save method according to embodiment 2 of the present invention. In embodiment 2 of the present invention, an operating process of an STA device is taken as an example to illustrate the power save method. As shown in FIG. 2, the method includes the following procedure.

Step 201: The STA device obtains a current frame of a current TXOP, in which the current frame includes a TXOP power save indication set by an AP device according to whether power save is allowed in the current TXOP and whether an identifier of a station STA is newly added in an operation object identifier of a subsequent frame.

In this step, the TXOP power save indication of each frame obtained by the STA device is respectively set by the AP according to whether power save is allowed in the current TXOP and whether an identifier of a station STA is newly added in an operation object identifier of the subsequent frame of each frame of the current TXOP. Specifically, the AP may adopt two methods to judge whether an identifier of a station STA is newly added in an operation object identifier of the subsequent frame of each frame of the current TXOP. A first method is that: it is judged whether the current frame and an operation object identifier before the current frame indicate an STA device required to transfer data in all frames after the current frame in the current TXOP, and if yes, it indicates that a new STA device is not indicated in each of subsequent frames of the current frame, the condition that no identifier of a station STA is newly added subsequently is satisfied; otherwise, the condition that no identifier of a station STA is newly added subsequently is unsatisfied. A second method is that: it is judged whether the operation object identifier of the current frame indicates an STA device required to transfer data in all frames after the current frame in the current TXOP, and if yes, it indicates that a new STA device is not indicated in each of subsequent frames of the current frame, the condition that no identifier of a station STA is newly added subsequently is satisfied; otherwise, the condition that no identifier of a station STA is newly added subsequently is unsatisfied. Any one of the foregoing methods is adopted to judge whether an identifier of a station STA is newly added subsequently, and a method for setting the TXOP power save indication is that: when an identifier of a station STA is newly added subsequently and power save is allowed in the current TXOP, the TXOP power save indication of the current frame of the current TXOP may be set to power save allowed; or, the TXOP power save indication of the current frame of the current TXOP may also be set to power save forbidden, and the TXOP power save indication of any frame after the current frame is set to power save allowed. When an identifier of a station STA is newly added subsequently, the TXOP power save indication of the current frame may be set to power save forbidden, that is, no matter whether power save is allowed in the current TXOP, as long as an identifier of a station STA is newly added subsequently, the TXOP power save indication of the current frame may be set to power save forbidden; and, when power save is not allowed in the current TXOP, no matter whether an identifier of a station STA is newly added subsequently, the TXOP power save indication of the current frame may be set to power save forbidden.

Step 202: When the TXOP power save indication of the current frame indicates that power save is allowed, the STA device determines whether to enter the Doze state according to a judgment result for a doze condition.

On the basis of the foregoing technical solution, further, when the TXOP power save indication of the current frame is power save forbidden, the STA device uses a next frame as a current frame, and returns to step 201.

In embodiment 2 of the present invention, TXOP power save indications of different frames in the same TXOP may be different, and only when two conditions that an identifier of a station STA is newly added and power save is allowed are both satisfied, a TXOP power save indication of a frame or a subsequent frame of the frame indicates power save allowed; only when the TXOP power save indication of the current frame indicates that power save is allowed, an STA judges a doze condition, and determines whether to enter the Doze state according to a judgment result. Because different TXOP power save indications are set for different frames, and if the operation object identifier of the first frame does not include all STA devices related to the TXOP, the TXOP power save indication of the first frame may be set to power save forbidden, and until operation object identifiers of multiple frames from the first frame to the current frame have included all STA devices related to the TXOP, the TXOP power save indication of the current frame is set to power save allowed, and therefore the method is still applicable to a case that the operation object identifier in the first frame of the TXOP does not include all STA devices related to the TXOP, thereby expanding the power save application range. Furthermore, in the case that the operation object identifier in the first frame of the TXOP does not include all STA devices related to the TXOP, power save cannot be performed in the TXOP all along by using the existing power save method, and if the power save method of embodiment 2 of the present invention is adopted, the TXOP power save indication of the first frame is power save forbidden, each STA device does not enter the Doze state after receiving the first frame, and until a frame where the TXOP power save indication indicates that power save is allowed, is received, each STA device judges whether to enter the Doze state according to the doze condition, thereby enhancing the power save effect.

Figure 3:
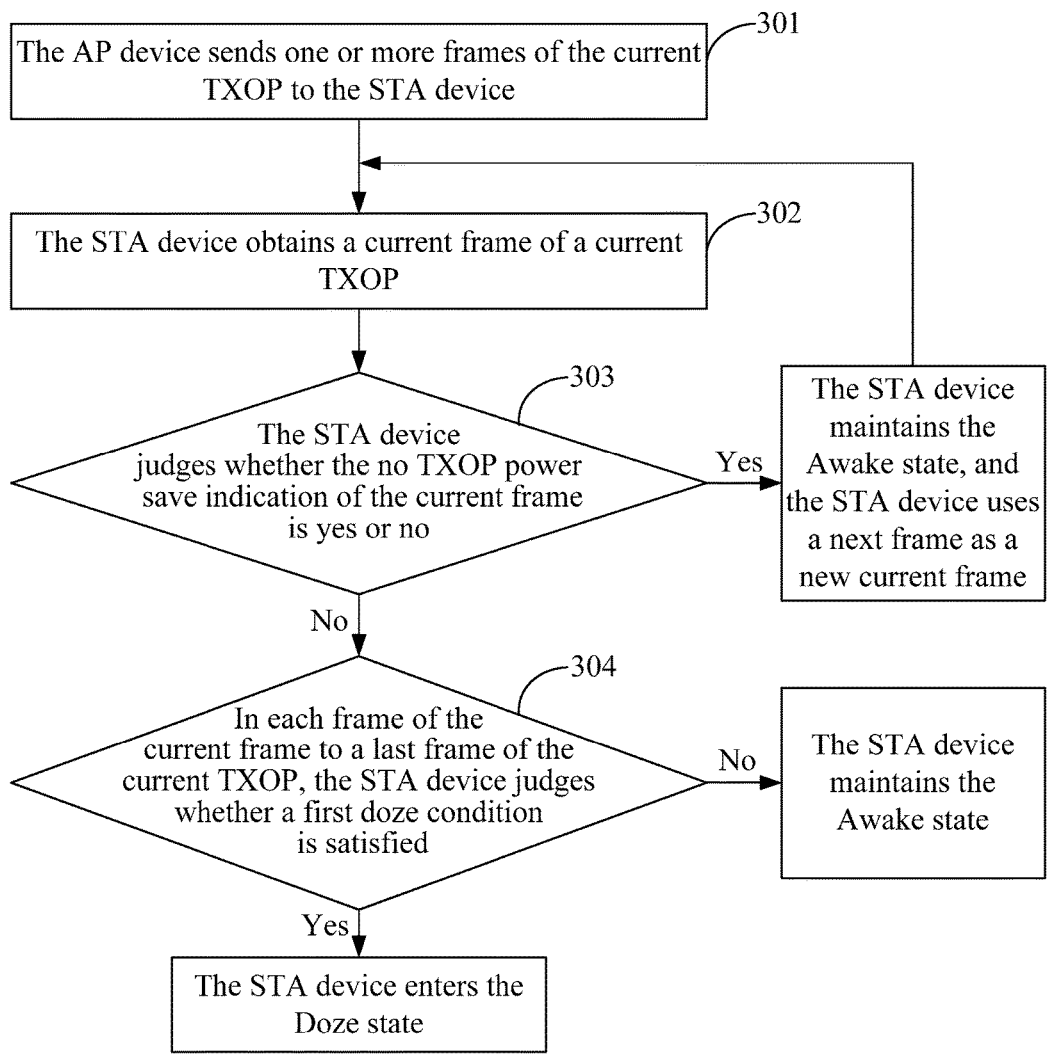
FIG. 3 is a flowchart of a power save method according to embodiment 3 of the present invention.

FIG. 3 is a flowchart of a power save method according to embodiment 3 of the present invention. In embodiment 3 of the present invention, an operating process of an AP device in combination with an STA device is taken as an example to illustrate the power save method. In embodiment 3 of the present invention, for a TXOP power save indication, a no TXOP power save indication is taken as an example, and, that when no identifier of an STA device is newly added in a current TXOP and power save is allowed in the current TXOP, an AP may set the no TXOP power save indication to no in the current frame is taken as an example. In embodiment 3 of the present invention, the doze condition includes a first doze condition. As shown in FIG. 3, the method includes the following procedure.

Step 301: The AP device sends one or more frames of the current TXOP to the STA device. Each frame includes: an operation object identifier of the frame and a no TXOP power save indication of the frame, and the no TXOP power save indication of each frame is respectively set by the AP according to whether an identifier of a station STA is newly added in an operation object identifier of a subsequent frame of each frame of the current TXOP.

In this step, a TXOP includes one or more frames, and the AP device delivers the no TXOP power save indication of the current frame to an STA device in each frame, and delivers an identifier of an STA device corresponding to an operation indicated by the current frame. The AP carries the no TXOP power save indication and the operation object identifier in a preamble sequence of each frame and sends the preamble sequence to the STA device. Specifically, in a very high throughput signal A1 (Very high throughput signal A1, VHT-SIG-A1 for short) field of the preamble sequence of each frame, one bit may be adopted for the no TXOP power save indication, and more than one bits are adopted to indicate the operation object identifier. For example, for the operation object identifier, one or more bits in the VHT-SIG-A1 field may be adopted to indicate the operation object identifier corresponding to the frame. For the no TXOP power save indication, a B22 bit of the VHT-SIG-A1 field may be adopted for the no TXOP power save indication, and the bit is referred to as a No TXOP PS bit. If the No TXOP PS bit is 0, it indicates that the no TXOP power save indication is no, an STA of this BSS is allowed to perform a power save operation, that is, the STA is allowed to be switched between the Awake state and the Doze state. If the No TXOP PS bit is 1, it indicates that the no TXOP power save indication is yes, an STA of this BSS is forbidden to perform a power save operation, that is, the STA may maintain the Awake state.

When the No TXOP PS bit of each frame is set, the AP not only performs setting according to whether power save is allowed in the current TXOP, but also needs to perform setting according to whether an identifier of a station STA is newly added in a subsequent frame of the current frame in the TXOP. Specifically, if no identifier of a station STA is newly added in the subsequent frame, and power save is allowed in the current TXOP, the AP device may set the No TXOP PS bit of the current frame to 0, indicating that the STA is allowed to perform power save, or may set the No TXOP PS bit of the current frame to 1, indicating that the STA is forbidden from performing power save. If no identifier of a station STA is newly added in the subsequent frame, and power save is not allowed in the current TXOP, the AP sets the No TXOP PS bit of the current frame to 1, indicating that the STA is allowed to perform power save. If an identifier of a station STA is newly added in the subsequent frame, the AP sets the No TXOP PS bit of the current frame to 1, indicating that the STA is allowed to perform power save in the current TXOP. Specifically, the AP device may adopt two methods recorded in embodiment 1 of the present invention and embodiment 2 of the present invention to judge whether an identifier of a station STA is newly added in an operation object identifier of the subsequent frame of each frame of the current TXOP. In embodiment 3 of the present invention, only adopting a second method is taken as an example for illustration. Specifically, if in the current frame and all frames after the current frame in the TXOP, the AP device transmits data to the same STA device only, or the AP device transmits data to only several users in the same MU-MIMO group, the AP device judges that no identifier of a station STA is newly added subsequently, and therefore the No TXOP PS bit may be used to indicate whether the STA may enter the Doze state, that is, No TXOP PS=0 may be set, or No TXOP PS=1 may be set. Otherwise, the AP device may set the No TXOP PS bit to 1, indicating that the STA device may not enter the Doze state, that is, if in frames after the current frame in the TXOP, the AP device needs to transmit data to an STA device other than several STA devices that are indicated by the operation object identifier of the current frame, the AP device may indicate that the STA device may not enter the Doze state. The specific case that in frames after the current frame in the TXOP, the AP device transmits data to an STA device other than several STA devices that are indicated by the operation object identifier of the current frame includes: in SU-MIMO mode, the AP device transmits data to an STA device other than the STA device that are indicated by the operation object identifier of the current frame; in MU-MIMO mode, the AP transmits data to an STA device other than a set formed of multiple STA devices that are indicated by the operation object identifier of the current frame.

In MU-MIMO mode, the operation object identifier is a group identity (Group Identity, Group ID for short). Before this power save method is executed, the Group ID is defined in advance through signaling and is set on the STA device. Specifically, in MU-MIMO mode, one or more MU-MIMO groups are included, in which each MU-MIMO group includes more than one STA device, generally four STA devices, and each of the foregoing one or more MU-MIMO groups is identified through a Group ID. Before this power save method is executed, the AP device sends the foregoing definition of the Group ID to each STA device through relevant signaling; after receiving the foregoing definition, each STA device stores the part relevant to itself in the foregoing definition, so that when this power save method is executed, the AP device sends the operation object identifier to the STA device, that is, the Group ID; after receiving the Group ID, the STA device can know whether the STA device belongs to the MU-MIMO group indicated by the Group ID according to the definition of the Group ID stored in the STA device itself; if the STA device belongs to the MU-MIMO group indicated by the Group ID, it indicates that the operation object identifier includes an indication for this STA device, and if the STA device does not belong to the MU-MIMO group indicated by the Group ID, it indicates that the operation object identifier does not include an indication for this STA device. In SU-MIMO mode, the operation object identifier is a partial association identifier (association identifier, AID for short) of an STA corresponding to the frame, or, the operation object identifier is a part of an AID of an STA corresponding to the frame, which also is referred to as a partial AID. A specific implementation manner is that, in SU-MIMO mode, the AID is formed of 12 bits, and the operation object identifier is lower 9 bits in the 12 bits of the AID. If the AID or partial AID is the same as an AID or partial AID of this STA device, it indicates that the operation object identifier includes an indication for this STA device, and if the AID or partial AID is different from the AID or partial AID of this STA device, it indicates that the operation object identifier does not include an indication for this STA device.

Step 302: The STA device obtains a current frame of a current TXOP, in which the current frame includes the no TXOP power save indication of the frame and the operation object identifier of the frame.

In this step, the STA device obtains the no TXOP power save indication and the operation object identifier of the current frame from a preamble sequence of a frame from the AP device.

Step 303: The STA device judges whether the no TXOP power save indication of the current frame is yes or no, if it is no, step 304 is executed; if it is yes, the STA device maintains the Awake state, and the STA device uses a next frame as a new current frame, and returns to step 302.

In this step, the STA device judges whether the foregoing one bit used for denoting the no TXOP power save indication is yes or no, if the bit is no, it indicates that two conditions are satisfied simultaneously, that is: the TXOP power save is allowed and no identifier of a station STA is newly added subsequently, power save may be performed, and the procedure continues to execute the following step 304; if the bit is yes, it indicates that one of the conditions is unsatisfied, or neither condition is satisfied, and the STA device maintains the Awake state.

Step 304: In each frame from the current frame to a last frame of the current TXOP, the STA device judges whether a first doze condition is satisfied, and if yes, the STA device enters the Doze state; if no, the STA device maintains the Awake state.

In this step, it is not required that doze conditions in existing communication protocol are modified according to the first doze condition thereby upgrading and reconstructing an existing communication device more conveniently.

Specifically, in MU-MIMO mode, the first doze condition may include any one or any combination of the following three conditions, and when one of the conditions is satisfied, that is, judging that the first doze condition is satisfied, the STA device enters the Doze state; when one or more conditions included by the first doze condition is unsatisfied, judging that the first doze condition is unsatisfied, the STA device maintains an Awake state. The three conditions specifically may include the following content. Condition 1: when an operation object identifier of a current frame does not include an indication for this STA device, the STA device enters the Doze state. Condition 2: when an operation object identifier of a current frame includes an indication for this STA device, and an indication of a spatial multiplexing stream number corresponding to this STA is 0, the STA device enters the Doze state. Condition 3: when an operation object identifier of a current frame includes an indication for this STA device, and this STA receives more data frames whose data bit indications are 0, the STA device enters the Doze state.

In this step, in SU-MIMO mode, the first doze condition may include any one or any combination of the following three conditions, and when one of the conditions is satisfied, that is, judging that the first doze condition is satisfied, the STA device enters the Doze state; when one or more conditions included by the first doze condition is unsatisfied, judging that the first doze condition is unsatisfied, the STA device maintains an Awake state. The three conditions specifically may include the following content. Condition 1: when a partial AID indicated in an operation object identifier of a current frame is different from a partial AID of this STA device, the STA device enters the Doze state. Condition 2: when the partial AID indicated in the operation object identifier of the current frame is the same as the partial AID of this STA device, but the current frame is not sent to this STA, the STA device enters the Doze state. Specifically, the STA device may judge whether the current frame is sent to this STA device in multiple manners, in which, a specific implementation manner is that, the STA device judges whether an MAC identifier of the current frame conforms to an MAC identifier of this STA device, and if yes, the current frame is sent to this STA device; if no, the current frame is not sent to this STA device. Condition 3: when an operation object identifier of a current frame includes an indication for this STA device, and this STA receives more data frames whose data bit indicators are 0, the STA device enters the Doze state.

When step 304 is executed, in each frame from the current frame to a last frame of the current TXOP, a judgment process of an exemplary implementation manner is as follows.

First step: The STA device judges whether the operation object identifier of the current frame includes an indication for this STA device, and if yes, a second step is executed; if no, the STA device enters the Doze state.

Second step: in MU-MIMO mode, judge whether an indication of a spatial multiplexing stream number corresponding to this STA is 0, or, whether this STA receives more data frames whose data bit indications are 0, and if yes, the STA device enters the Doze state; if no, the STA device maintains the Awake state. In SU-MIMO mode, judge whether the current frame is sent to this STA device, or, judge whether this STA receives more data frames whose data bit indications are 0, and if the current frame is not sent to this STA device or this STA device receives more data frames whose data bit indications are 0, the STA device enters the Doze state, and if the current frame is sent to this STA device and this STA device receives more data frames whose data bit indications are 1, the STA device maintains the Awake state.

In embodiment 3 of the present invention, No TXOP PS of different frames in the same TXOP may be different, and only when power save is allowed and no identifier of a station STA is newly added in the subsequent frame of the TXOP, the No TXOP PS of the frame may indicate power save allowed, and the STA determines whether to judge the first doze condition according to the indication of the No TXOP PS of the current frame. Because different No TXOP PS is set for different frames, and if the operation object identifier of the first frame does not include all STA devices related to the TXOP, the No TXOP PS of the first frame may be set to power save forbidden. it is assumed that the first method for judging whether an identifier of a station STA is newly added is adopted, and only until operation object identifiers of multiple frames from the first frame to the current frame have included all STA devices related to the TXOP, the No TXOP PS of the current frame may be set to power save allowed; it is assumed that the second method for judging whether an identifier of a station STA is newly added is adopted, and only until the operation object identifier of the current frame has included all STA devices related to all frames after the current frame in the TXOP, the No TXOP PS of the current frame may be set to power save allowed; therefore, the method is still applicable to a case that the operation object identifier in the first frame of the TXOP does not include all STA devices related to the TXOP, thereby expanding the power save application range. Furthermore, in the case that the operation object identifier in the first frame of the TXOP does not include all STA devices related to the TXOP, power save cannot be performed in the TXOP all along by using the existing power save method, and if the power save method of embodiment 3 of the present invention is adopted, the No TXOP PS of the first frame is power save forbidden, the STA device does not enter the Doze state after receiving the first frame, and until a frame where the No TXOP PS is power save allowed is received, the STA device judges whether to enter the Doze state according to the first doze condition, thereby enhancing the power save effect.

Figure 4:
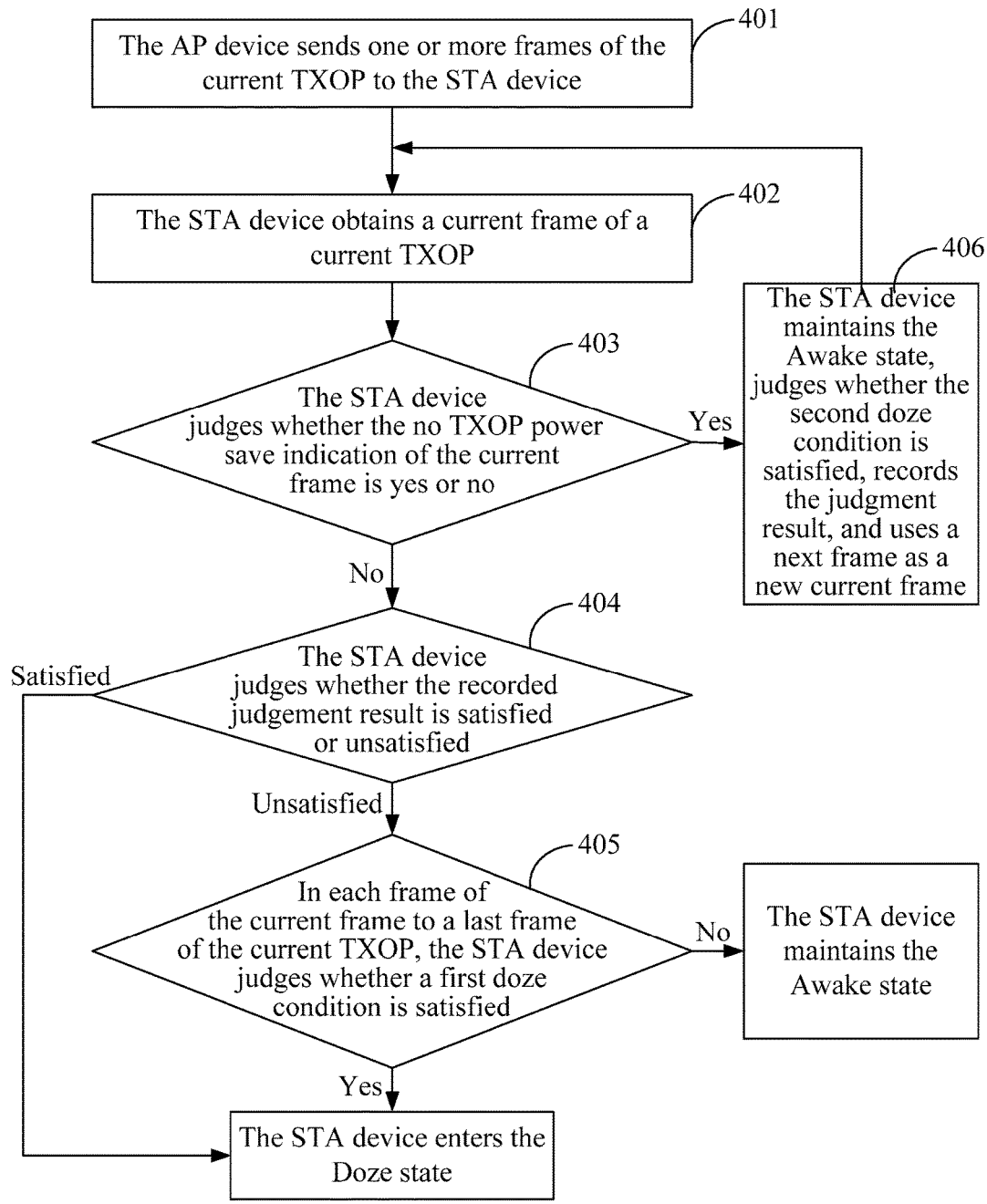
FIG. 4 is a flowchart of a power save method according to embodiment 4 of the present invention.

FIG. 4 is a flowchart of a power save method according to embodiment 4 of the present invention. In embodiment 4 of the present invention, an operating process of an AP device in combination with an STA device is taken as an example to illustrate the power save method. In embodiment 4 of the present invention, doze conditions include a first doze condition and a second doze condition. On the technology of the technical solution recorded in embodiment 3 of the present invention, when No TXOP PS of a current frame is power save forbidden, a step that the STA device judges the second doze condition and records a judgment result is added; when the No TXOP PS of the current frame is power save allowed, a step of determining whether to enter the Doze state according to the recorded judgment result is added. As shown in FIG. 4, the method includes the following procedure.

Step 401: The AP device sends one or more frames of the current TXOP to the STA device. Each frame includes: an operation object identifier of the frame and a no TXOP power save indication of the frame, and the no TXOP power save indication of each frame is respectively set by the AP according to whether an identifier of a station STA is newly added in an operation object identifier of a subsequent frame of each frame of the current TXOP.

This step is the same as step 301 in embodiment 3 of the present invention, and is not repeated herein.

Step 402: The STA device obtains a current frame of a current TXOP, in which the current frame includes the no TXOP power save indication of the frame and the operation object identifier of the frame.

This step is the same as step 302 in embodiment 3 of the present invention, and is not repeated herein.

Step 403: The STA device judges whether the no TXOP power save indication of the current frame is yes or no, and if it is no, step 404 is executed; if it is yes, step 406 is executed.

Step 404: The STA device judges whether the recorded judgment result is satisfied or unsatisfied, and if it is satisfied, the STA device enters the Doze state; if it is unsatisfied, step 405 is executed.

Step 405: In each frame from the current frame to a last frame of the current TXOP, the STA device judges whether a first doze condition is satisfied, and if yes, the STA device enters the Doze state; if no, the STA device maintains the Awake state.

This step is the same as step 304 in embodiment 3 of the present invention, and is not repeated herein.

Step 406: The STA device maintains the Awake state, judges whether the second doze condition is satisfied, records the judgment result, uses a next frame as a new current frame, and returns to step 402.

In this step, specifically, in MU-MIMO mode, the second doze condition may include a combination of one or both of the following two conditions. When one of the conditions is satisfied, that is, judging that the second doze condition is satisfied, the STA device records the judgment result to be: satisfied. When neither condition included by the second doze condition is unsatisfied, it is judged that the second doze condition is unsatisfied, the STA device records the judgment result to be: unsatisfied. The two conditions specifically may include the following content. Condition 1: an operation object identifier of a current frame includes an indication for this STA device, and an indication of a spatial multiplexing stream number corresponding to this STA is 0. Condition 2: an operation object identifier of a current frame includes an indication for this STA device, and this STA receives more data frames whose data bit indications are 0.

In this step, in SU-MIMO mode, the second doze condition may include a combination of one or both of the following two conditions. When one of the conditions is satisfied, that is, judging that the second doze condition is satisfied, the STA device records the judgment result to be: satisfied. When neither condition included by the second doze condition is unsatisfied, it is judged that the second doze condition is unsatisfied, the STA device records the judgment result to be: unsatisfied. The two conditions specifically may include the following content. Condition 1: the partial AID indicated in the operation object identifier of the current frame is the same as the partial AID of this STA device, but the current frame is not sent to this STA device. Specifically, the STA device may judge whether the current frame is sent to this STA device in multiple manners, in which, a specific implementation manner is that, the STA device judges whether an MAC identifier of the current frame conforms to an MAC identifier of this STA device, and if yes, the current frame is sent to this STA device; if no, the current frame is not sent to this STA device. Condition 2: an operation object identifier of a current frame includes an indication for this STA device, and this STA device receives more data frames whose data bit indications are 0.

In embodiment 4 of the present invention, No TXOP PS of different frames in the same TXOP may be different, and only when power save is allowed and no identifier of a station STA is newly added in the subsequent frame of the TXOP, the No TXOP PS of the frame indicates power save allowed. according to the indication of the No TXOP PS of the current frame, when the No TXOP PS of the current frame is power save forbidden, the STA device first judges the second doze condition and records a judgment result, and then judges No TXOP PS of a next frame; in a subsequent procedure, when receiving a frame where No TXOP PS is power save allowed, the STA device first determines whether to enter the Doze state according to the recorded judgment result of the second doze condition, and when the judgment result is unsatisfied, the STA device then judges the first doze condition for multiple frames from the current frame to a last frame, thereby determining whether to enter the Doze state. The method is still applicable to a case that the operation object identifier in the first frame of the TXOP does not include all STA devices related to the TXOP, thereby not only expanding the power save application range but also enhancing the power save effect. Furthermore, by judging the second doze condition in advance and recording a result when the No TXOP PS is power save forbidden, when the result is that the second doze condition is satisfied, once a frame where the No TXOP PS is power save allowed is received, the STA device may immediately enter the Doze state, and is not required to judge the first doze condition, so that the STA device may as soon as possible enter the Doze state, so as to further save judgment time for entering the Doze state, thereby enhancing the power save effect. Particularly, such an STA device may exist, which satisfies the second doze condition in at least one of frames where No TXOP PS is power save forbidden, but does not satisfy the second doze condition in each frame where No TXOP PS is power save allowed, and if technical solutions recorded in other embodiments are adopted, the STA device is incapable of entering the Doze state, while if the technical solution recorded in embodiment 4 of the present invention is adopted, the STA device may enter the Doze state, thereby further enhancing the power save effect.

Further, in embodiment 3 of the present invention and embodiment 4 of the present invention, the no TXOP power save indication is only a specific implementation manner of the TXOP power save indication, and technicians in this field may understand according to the prior art that, the allowed TXOP power save indication may also be adopted to denote the TXOP power save indication, when the allowed TXOP power save indication is yes, it indicates that power save is allowed in the current TXOP; when the allowed TXOP power save indication is no, it indicates that power save is forbidden in the current TXOP.

Further, in embodiment 1 of the present invention to embodiment 4 of the present invention, when setting the TXOP power save indication, the AP may further limit the number of times a value is changed and/or a change form of a value of the TXOP power save indication.

Because in the same TXOP, according to whether power save is allowed in the current TXOP and whether an identifier of a station STA is newly added in the subsequent frame of the TXOP, the AP device sets the TXOP power save indication of each frame, and the value of the TXOP power save indication may change multiple times; for example, in the first frame, power save is allowed and an identifier of a station STA is newly added subsequently, the TXOP power save indication of the first frame is power save forbidden, No TXOP PS=1 is taken as an example; in the second frame, power save is allowed and no identifier of a station STA is newly added subsequently, the TXOP power save indication of the second frame is power save allowed, No TXOP PS=0 is taken as an example; in the third frame, power save is not allowed and no identifier of a station STA is newly added subsequently, the TXOP power save indication of the third frame is power save forbidden, No TXOP PS=1 is taken as an example, and the rest may be deduced by analogy. On the basis of the foregoing technical solution, in order to reduce complexity of processing procedures of the AP device and the STA device, when the TXOP power save indication is set, the number of times a value of a TXOP power save indication is changed in one TXOP may be preset, and the AP device may further respectively set the TXOP power save indication of each frame according to a preset number of times the value of the TXOP power save indication is changed. For example, the preset number of times the value of the TXOP power save indication is changed is twice or three times, and an exemplary implementation manner is that, the preset number of times the value of the TXOP power save indication is changed is once, that is, in the same TXOP, the TXOP power save indication is only allowed to change once. In the foregoing example, according to whether power save is allowed in the current TXOP and whether an identifier of a station STA is newly added in the subsequent frame of the TXOP, a third frame should be set to No TXOP PS=1, but the preset number of times the value of the TXOP power save indication is changed is once, and in a second frame, the TXOP power save indication has changed relative to the first frame, so in a third frame, No TXOP PS is not changed, and No TXOP PS=0 the same as that for the second frame is still adopted.

On the basis of the foregoing technical solution, a change form of a value of a TXOP power save indication in one TXOP may be further preset, and the AP device sets the TXOP power save indication of each frame according to the preset change form of the value of the TXOP power save indication. For example, presetting a change form of a value of a TXOP power save indication in one TXOP to be: changed from a power save forbidden indication to a power save allowed indication. Therefore, in the same TXOP, the TXOP power save indication is only allowed to be changed from the power save forbidden indication to the power save allowed indication, that is, if the TXOP power save indication of a former frame of the current frame is power save forbidden, the TXOP power save indication of the current frame is allowed to be set to power save allowed, and if the TXOP power save indication of the former frame of the current frame indicates that power save is allowed, the TXOP power save indication of the current frame is not allowed to be set to power save forbidden. Taking No TXOP PS as an example, the value thereof is only allowed to be changed from 1 to 0, and when, according to whether power save is allowed in the current TXOP and whether an identifier of a station STA is newly added in an operation object identifier of the subsequent frame of each frame of the current TXOP, it is judged that, the power save allowed indication should be changed to the power save forbidden indication, the AP device does not alter the setting of the TXOP power save indication, that is, the TXOP power save indication is still maintained to be the power save allowed indication.

Further, on the basis of the foregoing technical solution, the current frame in the procedure may be further extended. Specifically, in step 302 and step 402, in addition to obtaining the current frame of the current TXOP, the STA device may further obtain more than one frame from the first frame to the current frame of the current TXOP, and the more than one frame includes respective operation object identifiers of the frames. When the first doze condition is judged in step 304, and the second doze condition is judged in step 406, all conditions judged according to the operation object identifier of the current frame are extended into conditions judged according to the operation object identifiers of the foregoing more than one frame.

FIG. 5 is a schematic structural diagram of an AP device according to embodiment 5 of the present invention. As shown in FIG. 5, the AP device at least includes: a setting module 51 and a sending module 52. A specific working process of the AP device of embodiment 5 of the present invention 5 may refer to the foregoing technical solutions recorded in embodiment 1 of the present invention to embodiment 4 of the present invention.

The setting module 51 is configured to, according to whether power save is allowed in a current TXOP and whether an identifier of a station STA is newly added in an operation object identifier of a subsequent frame of each frame of the current TXOP, set a TXOP power save indication of each frame.

The sending module 52 is configured to send one or more frames of the current TXOP to the STA device, so that when the TXOP power save indication of the current frame indicates that power save is allowed, the STA device determines whether to enter the Doze state according to a judgment result for a doze condition.

On the basis of the foregoing technical solutions, the setting module 51 is configured to, if power save is allowed in the current TXOP and no identifier of a station STA is newly added in an operation object identifier of a subsequent frame of the current frame of the current TXOP, set the TXOP power save indication of the current frame to power save allowed or power save forbidden; if power save is not allowed in the current TXOP, set the TXOP power save indication of the current frame to power save forbidden; and, if an identifier of a station STA is newly added in an operation object identifier of the subsequent frame of the current frame of the current TXOP, set the TXOP power save indication of the current frame to power save forbidden.

On the basis of the foregoing technical solutions, the setting module 51 is configured to, if power save is allowed in the current TXOP and no identifier of a station STA is newly added in an operation object identifier of a subsequent frame of the current frame of the current TXOP, set a TXOP power save indication of a frame at a preset position after the current frame to power save allowed or power save forbidden; if power save is not allowed in the current TXOP, set the TXOP power save indication of the current frame to power save forbidden; and, if an identifier of a station STA is newly added in an operation object identifier of the subsequent frame of the current frame of the current TXOP, set the TXOP power save indication of the current frame to power save forbidden.

On the basis of the foregoing technical solutions, the setting module 51 is configured to, if the current frame and an operation object identifier before the current frame indicate an STA device required to transfer data in all frames after the current frame in the current TXOP, determine that no identifier of a station STA is newly added in the operation object identifier of the subsequent frame of the current frame of the current TXOP. Or, the setting module 51 is configured to, if the operation object identifier of the current frame indicates an STA device required to transfer data in all frames after the current frame in the current TXOP, determine that no identifier of a station STA is newly added in the operation object identifier of the subsequent frame of the current frame of the current TXOP.

On the basis of the foregoing technical solutions, the setting module 51 is further configured to, according to a preset number of times a value of a TXOP power save indication is changed in one TXOP, set a TXOP power save indication of each frame. And/or, the setting module 51 is further configured to, according to a preset change form of a value of a TXOP power save indication in one TXOP, set a TXOP power save indication of each frame.

On the basis of the foregoing technical solutions, the setting module 51 is configured to, according to the preset number of times a value of a TXOP power save indication is changed in one TXOP being once, set a TXOP power save indication of each frame. And/or, the setting module 51 is configured to, according to a preset change form of a value of a TXOP power save indication in a TXOP being that a TXOP power save indication of a former frame of the current frame is power save forbidden, and the TXOP power save indication of the current frame indicates that power save is allowed, respectively set the TXOP power save indication of each frame.

In embodiment 5 of the present invention, Only when two conditions that no identifier of a station STA is newly added and power save is allowed are both satisfied, the setting module of the AP device sets the TXOP power save indications of the frame or the subsequent frame of the frame to power save allowed, so that the STA device determines whether the doze condition is judged according to the TXOP power save indication. Therefore, in a case that the operation object identifier in the first frame of the TXOP does not include all STA devices related to the TXOP, power save still can be performed, thereby expanding the power save application range and enhancing the power save effect.

FIG. 6 is a schematic structural diagram of an STA device according to embodiment 6 of the present invention. As shown in FIG. 6, the STA device at least includes: an obtaining module 61 and a control module 62. A specific working process of the STA device of embodiment 6 of the present invention 5 may refer to the foregoing technical solutions recorded in embodiment 1 of the present invention to embodiment 4 of the present invention.

The obtaining module 61 is configured to obtain a current frame of a current TXOP, in which the current frame includes a TXOP power save indication set by an AP device according to whether power save is allowed in the current TXOP and whether an identifier of a station STA is newly added in an operation object identifier of a subsequent frame.

The control module 62 is configured to, when the TXOP power save indication of the current frame indicates that power save is allowed, control the STA device to determine whether to enter the Doze state according to a judgment result for a doze condition.

On the basis of the foregoing technical solutions, the control module 62 is further configured to, when the TXOP power save indication of the current frame is power save forbidden, control the STA device to maintain an Awake state, and control the obtaining module 61 to obtain the current frame of the current TXOP by using a next frame as a current frame.

On the basis of the foregoing technical solutions, the control module 62 is configured to, when the TXOP power save indication of the current frame indicates that power save is allowed, judge whether a first doze condition is satisfied in each frame from the current frame to a last frame of the current TXOP, and if yes, control the STA device to enter the Doze state; if no, control the STA device to maintain the Awake state. The first doze condition includes that: an operation object identifier of the current frame does not include an indication for this STA device, or, the operation object identifier of the current frame includes the indication for this STA device and an indication of a spatial multiplexing stream number corresponding to this STA is 0, or, the operation object identifier of the current frame includes the indication for this STA device and this STA receives more data frames whose data bit indications are 0. Or, the first doze condition includes that: a partial AID indicated in the operation object identifier of the current frame is different from a partial AID of this STA device, or, the partial AID indicated in the operation object identifier of the current frame is the same as the partial AID of this STA device and the current frame is not sent to this STA, or, the operation object identifier of the current frame includes an indication for this STA device and this STA receives more data frames whose data bit indications are 0.

On the basis of the foregoing technical solutions, the control module 62 is further configured to, when the TXOP power save indication of the current frame is power save forbidden, judge whether a second doze condition is satisfied and record a judgment result. The second doze condition includes that: an operation object identifier of the current frame includes an indication for this STA device and an indication of a spatial multiplexing stream number corresponding to this STA is 0, or, the operation object identifier of the current frame includes the indication for this STA device and this STA receives more data frames whose data bit indications are 0. Or, the second doze condition includes that: the partial AID indicated in the operation object identifier of the current frame is the same as the partial AID of this STA device and the current frame is not sent to this STA, or, the operation object identifier of the current frame includes the indication for this STA device and this STA receives more data frames whose data bit indications are 0.

On the basis of the foregoing technical solutions, the control module 62 is further configured to, when the TXOP power save indication of the current frame indicates that power save is allowed, judge whether a recorded judgment result of the second doze condition is satisfied or unsatisfied, and if the judgment result is satisfied, control the STA device to enter the Doze state; if the judgment result is unsatisfied, judge whether the first doze condition is satisfied.

In embodiment 6 of the present invention, only when the two conditions that no identifier of a station STA is newly added and power save is allowed are both satisfied, a TXOP power save indications of a frame obtained by the obtaining module of the STA device or of a subsequent frame of the frame indicates power save allowed; only when the TXOP power save indication of the current frame indicates that power save is allowed, the control module of the STA device judges a doze condition, and determines whether to enter the Doze state according to a judgment result. Therefore, in the case that the operation object identifier in the first frame of the TXOP does not include all STA devices related to the TXOP, the method still can perform power save, thereby expanding the power save application range and enhancing the power save effect.

In another aspect of the present invention, with respect to the drawback existing in the prior art, an embodiment of the present invention proposes a power save method, without changing the method for setting No TXOP PS of all frames in the same TXOP to be the same in the prior art, and on the basis of this description, by indicating whether an identifier of a station STA is newly added subsequently in the frames of the TXOP, the application range of the power save method is expanded. For details, refer to the following embodiment 7 to embodiment 11.

FIG. 7 is a flowchart of a power save method according to embodiment 7 of the present invention. As shown in FIG. 7, the method includes the following procedure.

Step 701: An STA device respectively obtains a current frame and a preset frame of a current transmit opportunity (Transmit Opportunity, TXOP for short), in which the current frame includes a subsequent STA indication and a TXOP power save indication, and the preset frame includes an operation object identifier.

Step 702: When the TXOP power save indication of the current frame is allowed, the operation object identifier of the preset frame does not include an indication for this STA device, and the subsequent STA indication of the current frame is that no identifier of a station STA is newly added subsequently, the STA device enters a Doze state.

On the basis of the foregoing technical solutions, step 702 further includes that: When the TXOP power save indication of the current frame is allowed, the operation object identifier of the preset frame does not include an indication for this STA device, and the subsequent STA indication of the current frame is that an identifier of a station STA is newly added subsequently, the STA device maintains the Awake state.

In embodiment 7 of the present invention, the STA device performs judgment according to three conditions which are a TXOP power save indication, a subsequent STA indication, and a range included by an operation object identifier, and when the TXOP power save indication is allowed, the subsequent STA indication is that no identifier of a station STA is newly added subsequently and the operation object identifier of the preset frame does not include an identifier of this STA device, the STA device enters the Doze state. Therefore, the method is still applicable to a case that the operation object identifier in the first frame of the TXOP does not include all STA devices related to the TXOP, thereby expanding the power save application range. Furthermore, in the case that the operation object identifier in the first frame of the TXOP does not include all STA devices related to the TXOP, power save cannot be performed in the TXOP all along by using the existing power save method, and if the power save method of embodiment 7 of the present invention is adopted, the STA device does not enter the Doze state after receiving the first frame, and until a frame where a subsequent STA indication that no identifier of a station STA is newly added subsequently is received, the STA device begins to enter the Doze state, thereby enhancing the power save effect.

Figure 8:
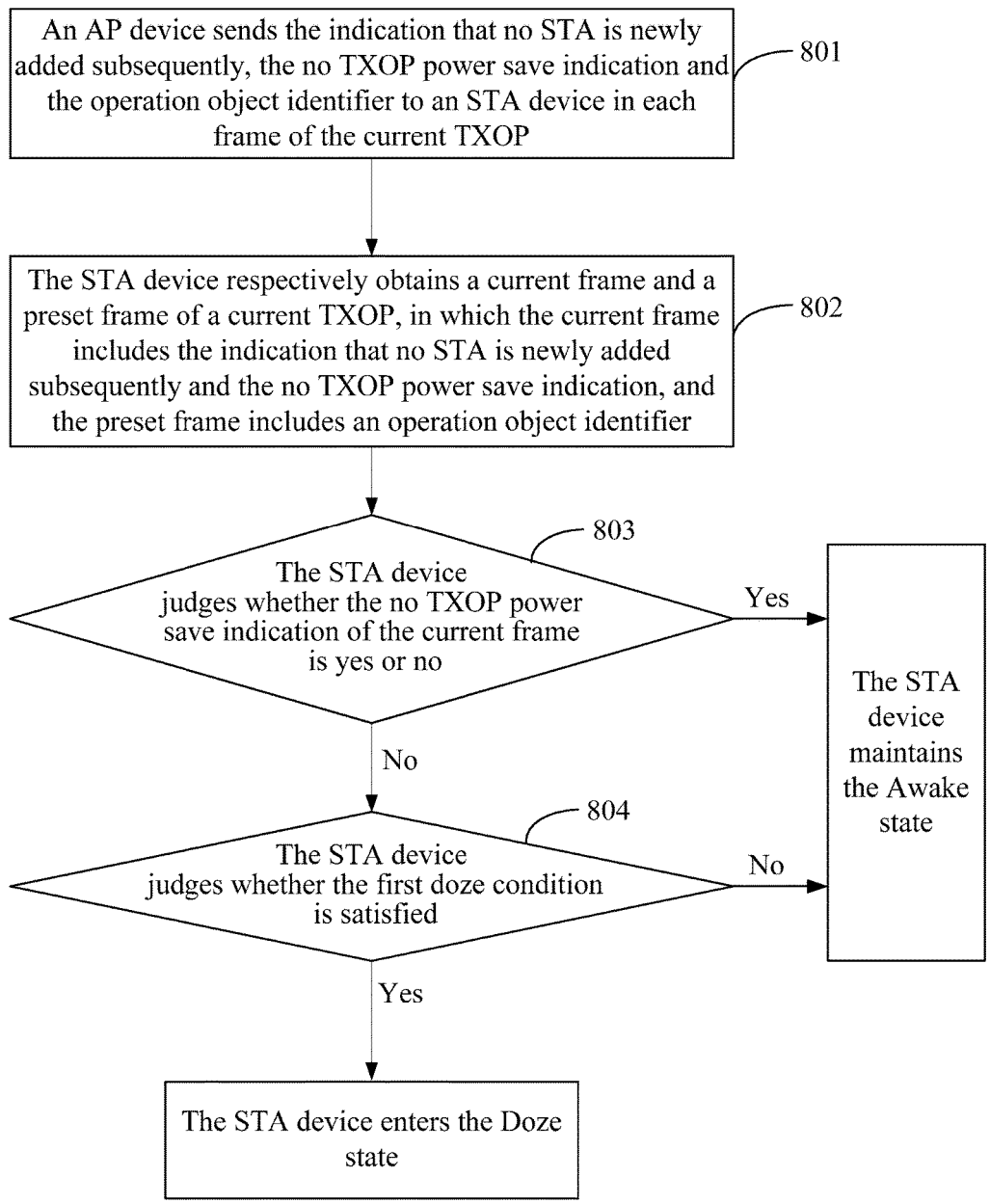
FIG. 8 is a flowchart of a power save method according to embodiment 8 of the present invention.

FIG. 8 is a flowchart of a power save method according to embodiment 8 of the present invention. Specifically, in embodiment 8 of the present invention, the subsequent STA indication is an indication that no identifier of a station STA is newly added subsequently (referred to as a No More STA indication), and when the indication that no identifier of a station STA is newly added subsequently is yes, it indicates that no identifier of a station STA is newly added subsequently; when the indication that no identifier of a station STA is newly added subsequently is no, it indicates that an identifier of a station STA is newly added subsequently. In embodiment 8 of the present invention, the TXOP power save indication is a no TXOP power save indication, that is, the No TXOP PS indication, and when the no TXOP power save indication is yes, it indicates that power save is forbidden in the current TXOP; when the no TXOP power save indication is no, it indicates that power save is allowed in the current TXOP.

Furthermore, in embodiment 8 of the present invention, the indication that no identifier of a station STA is newly added subsequently and the no TXOP power save indication are respectively indicated by adopting 1 bit. As shown in FIG. 8, the method includes the following procedure.

Step 801: An AP device sends the indication that no identifier of a station STA is newly added subsequently, the no TXOP power save indication and the operation object identifier to an STA device in each frame of the current TXOP.

In this step, the AP device directly delivers whether the indication that no identifier of a station STA is newly added subsequently is yes or no, and whether the no TXOP power save indication is yes or no, and an identifier of the STA device corresponding to an operation indicated by this frame to the STA device. A TXOP includes one or more frames, and the AP carries the indication that no identifier of a station STA is newly added subsequently, the no TXOP power save indication and the operation object identifier in a preamble sequence of each frame and sends the preamble sequence to the STA device. Specifically, in a very high throughput signal A1 (Very high throughput signal A1, VHT-SIG-A1 for short) field of the preamble sequence of each frame, a bit is adopted for the indication that no identifier of a station STA is newly added subsequently, one bit is adopted for the no TXOP power save indication, and more than one bit is adopted to indicate the operation object identifier. For example, a reserved (Reserved, RSVD for short) bit of the VHT-SIG-A1 field is adopted for the indication that no identifier of a station STA is newly added subsequently, and the bit is referred to as a NoMoreSTA bit; when the NoMoreSTA bit is 1, it indicates that the indication that no identifier of a station STA is newly added subsequently is yes, all STA devices related to the current TXOP have been indicated in the operation object identifiers of the current frame and frames before the current frame, and no new STA device is indicated in each of subsequent frames of the current frame; when the NoMoreSTA bit is 0, it indicates that the indication that no identifier of a station STA is newly added subsequently is no, not all STA devices related to the current TXOP are indicated in the operation object identifiers of the current frame and frames before the current frame, and a new STA device is indicated in each of subsequent frames of the current frame. For the no TXOP power save indication, a B22 bit of the VHT-SIG-A1 field may be adopted for the no TXOP power save indication, and the bit is referred to as a No TXOP PS bit; if the No TXOP PS bit is 0, it indicates that the no TXOP power save indication is no, an STA of this BSS is allowed to perform a power save operation, that is, the STA is allowed to be switched between the Awake state and the Doze state; if the No TXOP PS bit is 1, it indicates that the no TXOP power save indication is yes, an STA of this BSS is forbidden to perform a power save operation. For the operation object identifier, one or more bits in the VHT-SIG-A1 field may be adopted to indicate the operation object identifier corresponding to the frame.

In MU-MIMO mode, the operation object identifier is a group identity (Group Identity, Group ID for short). Before this power save method is executed, the Group ID is defined in advance through signaling and is set on the STA device. Specifically, in MU-MIMO mode, one or more MU-MIMO groups are included, in which each MU-MIMO group includes more than one STA device, generally four STA devices, and each of the foregoing one or more MU-MIMO groups is identified through a Group ID. Before this power save method is executed, the AP device sends the foregoing definition of the Group ID to each STA device through relevant signaling; after receiving the foregoing definition, each STA device stores the part relevant to itself in the foregoing definition, so that when this power save method is executed, the AP device sends the operation object identifier to the STA device, that is, the Group ID; after receiving the Group ID, the STA device can know whether the STA device belongs to the MU-MIMO group indicated by the Group ID according to the definition of the Group ID stored in the STA device itself; if the STA device belongs to the MU-MIMO group indicated by the Group ID, it indicates that the operation object identifier includes an indication for this STA device, and if the STA device does not belong to the MU-MIMO group indicated by the Group ID, it indicates that the operation object identifier does not include an indication for this STA device. In SU-MIMO mode, the operation object identifier is a partial association identifier (association identifier, AID for short) of an STA corresponding to the frame, or, the operation object identifier is a part of an AID of an STA corresponding to the frame, which also is referred to as a partial AID. A specific implementation manner is that, in SU-MIMO mode, the AID is formed of 12 bits, and the operation object identifier is lower 9 bits in the 12 bits of the AID. If the AID or partial AID is the same as an AID or partial AID of this STA device, it indicates that the operation object identifier includes an indication for this STA device, and if the AID or partial AID is different from the AID or partial AID of this STA device, it indicates that the operation object identifier does not include an indication for this STA device.

Step 802: The STA device respectively obtains a current frame and a preset frame of a current TXOP, in which the current frame includes the indication that no identifier of a station STA is newly added subsequently and the no TXOP power save indication, and the preset frame includes an operation object identifier.

In this step, the STA device obtains the indication that no identifier of a station STA is newly added subsequently of the current frame, the no TXOP power save indication of the current frame and the operation object identifier of the preset frame from a preamble sequence of a frame from the AP device. The preset frame may adopt two specific implementation manners, and in a first implementation manner, the preset frame is the current frame of the current TXOP; in a second implementation manner, the preset frame is one or more frames from the first frame to the current frame of the current TXOP.

Step 803: The STA device judges whether the no TXOP power save indication of the current frame is yes or no, and if it is yes, the STA device maintains the Awake state; if it is no, step 804 is executed.

In this step, if the no TXOP power save indication of the current frame is yes, it indicates that the AP device forbids the STA device from performing power save in the current TXOP, and therefore, the STA device needs to maintain the Awake state. If the no TXOP power save indication of the current frame is no, it indicates that the AP device allows the STA device to perform power save in the current TXOP, and the procedure continues to execute the following step 804.

Step 804: The STA device judges whether the first doze condition is satisfied, and if yes, the STA device enters the Doze state; if no, the STA device maintains the Awake state.

In this step, in MU-MIMO mode, the first doze condition may include any one or any combination of the following three conditions, and when one of the conditions is satisfied, that is, judging that the first doze condition is satisfied, the STA device enters the Doze state; when one or more conditions included by the first doze condition is unsatisfied, judging that the first doze condition is unsatisfied, the STA device maintains an Awake state. The three conditions specifically may include the following content. Condition 1: when an operation object identifier of a preset frame does not include an indication for this STA device, and the indication that no identifier of a station STA is newly added subsequently of the current frame is yes, the STA device enters the Doze state. Condition 2: when an operation object identifier of a preset frame includes an indication for this STA device, and an indication of a spatial multiplexing stream number corresponding to this STA is 0, the STA device enters the Doze state. Condition 3: when an operation object identifier of a preset frame includes an indication for this STA device, and this STA receives more data frames whose data bit indications are 0, the STA device enters the Doze state.

In this step, in SU-MIMO mode, the first doze condition may include a combination of one or more of the following three conditions, and when one of the conditions is satisfied, that is, judging that the first doze condition is satisfied, the STA device enters the Doze state; when one or more conditions included by the first doze condition is unsatisfied, judging that the first doze condition is unsatisfied, the STA device maintains an Awake state. The three conditions specifically may include the following content. Condition 1: when a partial AID indicated by an operation object identifier of a preset frame is different from a partial AID of this STA device, and the indication that no identifier of a station STA is newly added subsequently of the current frame is yes, the STA device enters the Doze state. Condition 2: when a partial AID indicated by an operation object identifier of a preset frame is the same as a partial AID of this STA device, and the indication that no identifier of a station STA is newly added subsequently of the current frame is yes, but the current frame is not sent to this STA, the STA device enters the Doze state. Specifically, the STA device may judge whether the current frame is sent to this STA device in multiple manners, in which, a specific implementation manner is that, the STA device judges whether a medium access control (Medium Access Control, MAC for short) identifier of the current frame conforms to an MAC identifier of this STA device, and if yes, the current frame is sent to this STA device; if no, the current frame is not sent to this STA device. Condition 3: when an operation object identifier of a preset frame includes an indication for this STA device, and this STA receives more data frames whose data bit indications are 0, the STA device enters the Doze state.

When step 804 is executed, a judgment process of an exemplary implementation manner is as follows.

First step: The STA device judges whether the operation object identifier of the preset frame includes an indication for this STA device, and if yes, a second step is executed; if no, a third step is executed. In the first step, for the foregoing two specific implementation manners of the preset frame, if the preset frame is the current frame of the current TXOP, in the first step, it is judged whether the operation object identifier of the current frame includes an indication for this STA device; if the preset frame is from the first frame to the current frame of the current TXOP, in the first step, it is judged whether operation object identifiers of multiple frames from the first frame to the current frame include an indication for this STA device.

Second step: In MU-MIMO mode, judge whether an indication of a spatial multiplexing stream number corresponding to this STA is 0, or, whether this STA receives more data frames whose data bit indications are 0, and if yes, the STA device enters the Doze state; if no, the STA device maintains the Awake state. In the SU-MIMO mode, judge whether the current frame is sent to this STA device, or, judge whether this STA receives more data frames whose data bit indications are 0, and if the current frame is not sent to this STA device or this STA device receives more data frames whose data bit indications are 0, the STA device enters the Doze state; and if the current frame is sent to this STA device and this STA device receives more data frames whose data bit indications are 1, the STA device maintains the Awake state. In the second step, when the operation object identifier of the preset frame includes the indication for this STA device, the second doze condition in the existing power save method is adopted to judge whether the STA device enters the Doze state. The specific judgment for the second doze condition is the same as that in the existing power save method, and is not repeated herein.

Third step: The STA device judges whether the indication that no identifier of a station STA is newly added subsequently of the current frame is yes or no, and if it is yes, the STA device enters the Doze state; if it is no, the STA device maintains the Awake state. In the third step, if the indication that no identifier of a station STA is newly added subsequently of the current frame is no, demonstrating that a newly added STA still may occur in a subsequent frame, therefore, until the current frame, an STA device still not included in the operation object identifier still may be used in an operation of the subsequent frame, and therefore, the STA device needs to maintain the Awake state. If the indication that no identifier of a station STA is newly added subsequently of the current frame is yes, demonstrating that no newly added STA occurs in a subsequent frame, it may be considered that an STA device still not included in the operation object identifier of the preset frame is enabled to enter the Doze state, and a receiver of this STA device is turned off, so as to save power consumption of the STA device.

In embodiment 8 of the present invention, An AP device sends the indication that no identifier of a station STA is newly added subsequently, the no TXOP power save indication and the operation object identifier to an STA device in each frame of the current TXOP; the STA device directly obtains a no TXOP power save indication through from the AP device, and first judges whether power save is allowed according to the no TXOP power save indication, and then judges whether to enter the Doze state according to the operation object identifier and the indication that no identifier of a station STA is newly added subsequently sequentially when power save is allowed. Therefore, the method does not require the operation object identifier in the first frame of the TXOP to include all STA devices related to the TXOP, thereby expanding the application range of the power save method, and enhancing the power save effect.

Figure 9:
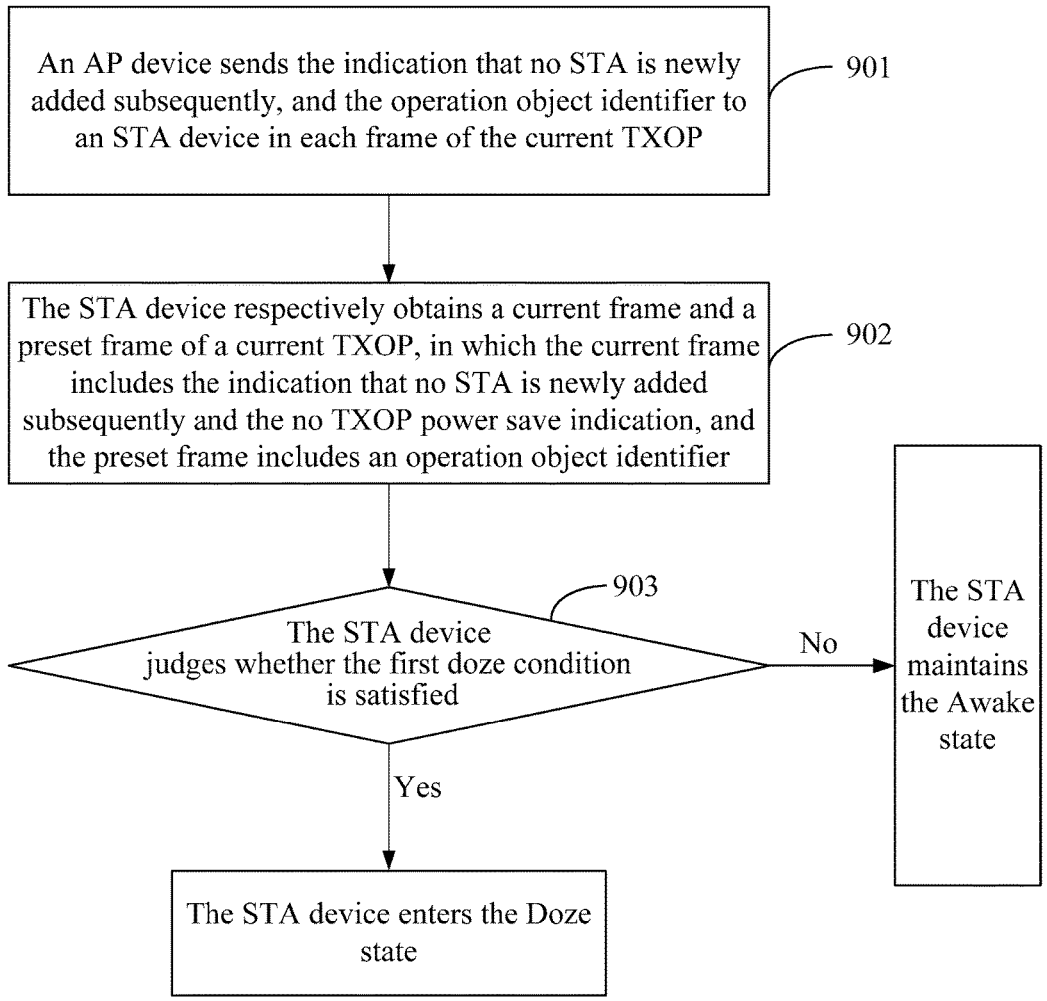
FIG. 9 is a flowchart of a power save method according to embodiment 9 of the present invention.

FIG. 9 is a flowchart of a power save method according to embodiment 9 of the present invention. In embodiment 9 of the present invention, that the subsequent STA indication is the indication that no identifier of a station STA is newly added subsequently, and the TXOP power save indication is the no TXOP power save indication is still taken as an example.

Furthermore, in embodiment 9 of the present invention, in order to save signaling resources, a bit for indicating the no TXOP power save indication is not used anymore, and communication parties are enabled to in advance stipulate that the no TXOP power save indication is no, that is, power save is allowed in the current TXOP by default, so that the bit is not required to be adopted to perform an indication, thereby saving signaling overhead of a bit. Specifically, the method may adopt a manner for specifying a communication standard, it may be specified that the no TXOP power save indication is no in the communication standard, or the indication information about the no TXOP power save indication is not related in the communication standard, that is, equivalent to that the standard allows power save in the current TXOP by default. However, the indication that no identifier of a station STA is newly added subsequently still adopts a bit to perform an indication. As shown in FIG. 9, the method includes the following procedure.

Step 901: An AP device sends the indication that no identifier of a station STA is newly added subsequently, and the operation object identifier to an STA device in each frame of the current TXOP.

In this step, the specific method in which the AP device sends the indication that no identifier of a station STA is newly added subsequently and the operation object identifier to the STA device in each frame of the current TXOP is the same as the method recorded in step 801 in embodiment 8 of the present invention, and is not repeated herein.

Step 902: The STA device respectively obtains a current frame and a preset frame of a current TXOP, in which the current frame includes the indication that no identifier of a station STA is newly added subsequently and the no TXOP power save indication, and the preset frame includes an operation object identifier.

In this step, the STA device, according to a preset no TXOP power save indication, obtains that the no TXOP power save indication is no. The specific method in which the STA device obtains the indication that no identifier of a station STA is newly added subsequently of the current frame of the current TXOP and the operation object identifier of the preset frame is the same as the method recorded in step 802 in embodiment 8 of the present invention, and is not repeated herein.

Because in embodiment 9 of the present invention, it is equivalent to that communication parties has stipulated that the no TXOP power save indication is no, the STA device is not required to judge the no TXOP power save indication, and the process may directly execute the following step 903.

Step 903: The STA device judges whether the first doze condition is satisfied, and if yes, the STA device enters the Doze state; if no, the STA device maintains the Awake state.

The specific method of this step is the same as the method recorded in step 804 in embodiment 8 of the present invention, and is not repeated herein.

In embodiment 9 of the present invention, through a manner specified by a communication protocol, communication parties in advance have stipulated that the no TXOP power save indication is no, that is, power save is allowed in the current TXOP by default, so signaling overhead is saved, and the step in which the STA device judges whether the no TXOP power save indication of the current frame is yes or no may be omitted, thereby further increasing the judgment efficiency of the power save method, and enhancing the power save effect.

In embodiment 8 of the present invention and embodiment 9 of the present invention, the indication that no identifier of a station STA is newly added subsequently and the no TXOP power save indication are only a specific implementation manner of the subsequent STA indication and the TXOP power save indication respectively; technicians in this field may understand according to the prior art that, the indication that an identifier of a station STA is newly added subsequently may also be adopted to denote the subsequent STA indication; and when the indication that an identifier of a station STA is newly added subsequently is yes, it indicates that an identifier of a station STA is newly added subsequently; when the indication that an identifier of a station STA is newly added subsequently is no, it indicates that no identifier of a station STA is newly added subsequently. By the same token, the allowed TXOP power save indication may also be adopted to denote the TXOP power save indication, when the allowed TXOP power save indication is yes, it indicates that power save is allowed in the current TXOP; when the allowed TXOP power save indication is no, it indicates that power save is forbidden in the current TXOP.

Figure 10:
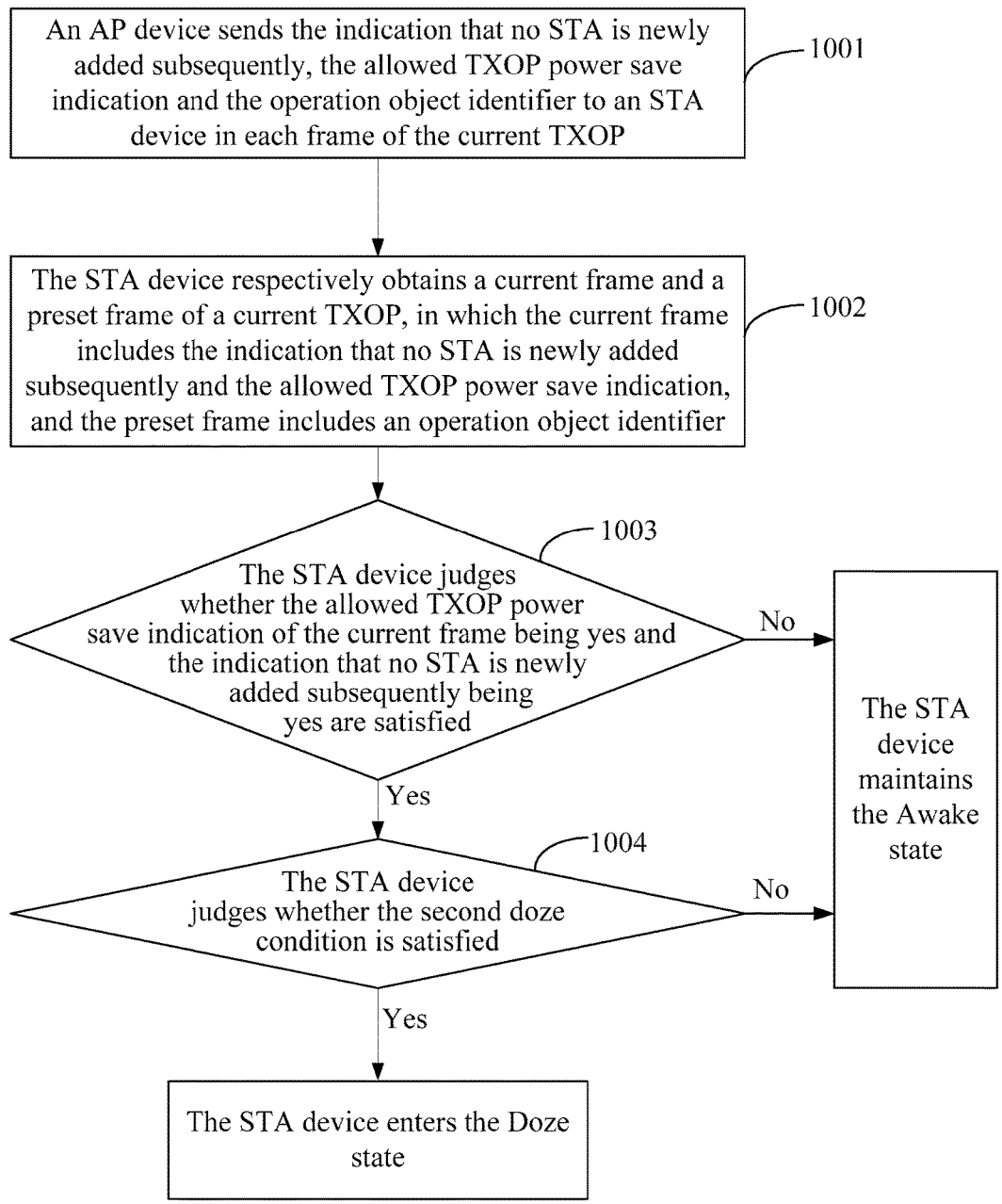
FIG. 10 is a flowchart of a power save method according to embodiment 10 of the present invention.

FIG. 10 is a flowchart of a power save method according to embodiment 10 of the present invention. In embodiment 10 of the present invention, the subsequent STA indication is the indication that no identifier of a station STA is newly added subsequently, and the TXOP power save indication is the allowed TXOP power save indication. Furthermore, in embodiment 10 of the present invention, a bit is adopted for indicating the indication that no identifier of a station STA is newly added subsequently and the allowed TXOP power save indication simultaneously, thereby saving a bit, and saving the signaling overhead. As shown in FIG. 10, the method includes the following procedure.

Step 1001: An AP device sends the indication that no identifier of a station STA is newly added subsequently, the allowed TXOP power save indication and the operation object identifier to an STA device in each frame of the current TXOP.

In this step, the specific method in which the AP device sends the operation object identifier to the STA device is the same as the method recorded in step 801 of embodiment 8 of the present invention. However, the AP device sends the indication that no identifier of a station STA is newly added subsequently and the allowed TXOP power save indication to the STA device by adopting the same bit. Specifically, the indication that no identifier of a station STA is newly added subsequently and the allowed TXOP power save indication include 1 bit in total, and when no identifier of a station STA is newly added subsequently and power save is allowed in the current TXOP, the bit is yes, generally denoted with a value 1; in any other case, the bit is no, generally denoted with a value 0, and for example: when an identifier of a station STA is newly added subsequently, no matter whether power save is allowed in the current TXOP, the bit is no; or, when power save is forbidden in the current TXOP, no matter whether an identifier of a station STA is newly added subsequently, the bit is no.

Step 1002: The STA device respectively obtains a current frame and a preset frame of a current TXOP, in which the current frame includes the indication that no identifier of a station STA is newly added subsequently and the allowed TXOP power save indication, and the preset frame includes an operation object identifier.

Step 1003: The STA device judges whether the allowed TXOP power save indication of the current frame being yes and the indication that no identifier of a station STA is newly added subsequently being yes are satisfied, if yes, step 1004 is executed; if no, the STA device maintains the Awake state.

In this step, the STA device judges whether the foregoing 1 bit used for indicating the indication that no identifier of a station STA is newly added subsequently and the allowed TXOP power save indication simultaneously is yes or no, if the bit is yes, it indicates that the allowed TXOP power save indication of the current frame being yes and the indication that no identifier of a station STA is newly added subsequently being yes are satisfied simultaneously, power save may be performed, and the procedure continues to execute the following step 1004; if the bit is no, it indicates that one of the conditions is unsatisfied, or neither condition is satisfied, and the STA device maintains the Awake state.

Step 1004: The STA device judges whether the second doze condition is satisfied, and if yes, the STA device enters the Doze state; if no, the STA device maintains the Awake state.

In this step, the second doze condition may include two doze conditions in the prior art, that is, it is not required to modify doze conditions in existing communication protocols, thereby upgrading and reconstructing an existing communication device more conveniently.

Specifically, in MU-MIMO mode, the second doze condition may include any one or any combination of the following three conditions, and when one of the conditions is satisfied, that is, judging that the second doze condition is satisfied, the STA device enters the Doze state; when one or more conditions included by the second doze condition is unsatisfied, judging that the second doze condition is unsatisfied, the STA device maintains an Awake state. The three conditions specifically may include the following content. Condition 1: when an operation object identifier of a preset frame does not include an indication for this STA device, the STA device enters the Doze state. Condition 2: when an operation object identifier of a preset frame includes an indication for this STA device, and an indication of a spatial multiplexing stream number corresponding to this STA is 0, the STA device enters the Doze state. Condition 3: when an operation object identifier of a preset frame includes an indication for this STA device, and this STA receives more data frames whose data bit indications are 0, the STA device enters the Doze state.

In this step, in SU-MIMO mode, the second doze condition may include any one or any combination of the following three conditions, and when one of the conditions is satisfied, that is, judging that the second doze condition is satisfied, the STA device enters the Doze state; when one or more conditions included by the second doze condition is unsatisfied, judging that the second doze condition is unsatisfied, the STA device maintains an Awake state. The three conditions specifically may include the following content. Condition 1: when a partial AID indicated in an operation object identifier of a preset frame is different from a partial AID of this STA device, the STA device enters the Doze state. Condition 2: when the partial AID indicated in the operation object identifier of the preset frame is the same as the partial AID of this STA device, but the current frame is not sent to this STA, the STA device enters the Doze state. Specifically, the STA device may judge whether the current frame is sent to this STA device in multiple manners, in which, a specific implementation manner is that, the STA device judges whether an MAC identifier of the current frame conforms to an MAC identifier of this STA device, and if yes, the current frame is sent to this STA device; if no, the current frame is not sent to this STA device. Condition 3: when an operation object identifier of a preset frame includes an indication for this STA device, and this STA receives more data frames whose data bit indications are 0, the STA device enters the Doze state.

When step 1004 is executed, a judgment process of an exemplary implementation manner is as follows.

First step: The STA device judges whether the operation object identifier of the preset frame includes an indication for this STA device, and if yes, a second step is executed; if no, the STA device enters the Doze state.

Second step: In MU-MIMO mode, judge whether an indication of a spatial multiplexing stream number corresponding to this STA is 0, or, whether this STA receives more data frames whose data bit indications are 0, and if yes, the STA device enters the Doze state; if no, the STA device maintains the Awake state. In SU-MIMO mode, judge whether the current frame is sent to this STA device, or, judge whether this STA receives more data frames whose data bit indications are 0, and if the current frame is not sent to this STA device or this STA device receives more data frames whose data bit indications are 0, the STA device enters the Doze state; and if the current frame is sent to this STA device and this STA device receives more data frames whose data bit indications are 1, the STA device maintains the Awake state.

In embodiment 10 of the present invention, 1 bit is adopted for indicating the indication that no identifier of a station STA is newly added subsequently and the allowed TXOP power save indication simultaneously, thereby further saving the signaling overhead of 1 bit.

On the basis of the foregoing technical solutions recorded in embodiment 7 of the present invention to embodiment 10 of the present invention, further, the power save method further includes the following step: the STA device sets a contained identifier. The contained identifier is used for denoting whether the identifier of the STA device is included in the operation object identifier of the preset frame, and the contained identifier initially is set to no. Specifically, the STA device may adopt a bit as the contained identifier, and during initial setting, the value of the bit is 0, as long as an operation object identifier of a frame includes the identifier of the STA device, the bit value corresponding to the contained identifier of the STA device is set to 1, and after a subsequent frame is received, the bit value is still maintained to be 1. In the foregoing three embodiments, the step of setting the contained identifier for the STA device respectively may be executed before or at the same time of the foregoing step 701, step 801, step 901 and step 1002. After the STA device obtains the operation object identifier of the preset frame, the STA device judges whether the current contained identifier is yes or no, and if it is yes, the contained identifier is maintained to be yes; if it is no, it is judged whether the operation object identifier of the current frame includes an identifier of this STA device, and if yes, the contained identifier is set to yes; otherwise, the contained identifier is maintained to be no. In step 702, step 804, step 903 and step 1004, a specific method for judging whether the operation object identifier of the preset frame includes the identifier of this STA device includes: judging whether the contained identifier is yes or no, in which if the contained identifier is yes, it indicates that the identifier of this STA device has been included in the operation object identifier of the preset frame, and if the contained identifier is no, it indicates that the identifier of this STA device is not included in the operation object identifier of the preset frame. The manner of setting the contained identifier is adopted, so that the step of judging whether the operation object identifier of the preset frame includes the identifier of this STA device is simple, convenient and easy, thereby increasing the judgment processing efficiency.

On the basis of the foregoing technical solutions recorded in embodiment 7 of the present invention to embodiment 10 of the present invention, further, the power save method further includes that: the STA device obtains duration information of the current TXOP. In the foregoing three embodiments, the step in which the STA device obtains the duration information of the current TXOP respectively may be executed before or at the same time of the foregoing step 701, step 801, step 901 and step 1002. In step 702, step 804, step 903 and step 1004, After the STA device enters the Doze state, and when the duration of the current TXOP ends, the STA device enters the Awake state, thereby ensuring that when a next TXOP comes, the STA device is in the Awake state, and successfully receives corresponding indication information carried in a frame of the next TXOP.

Figure 11:
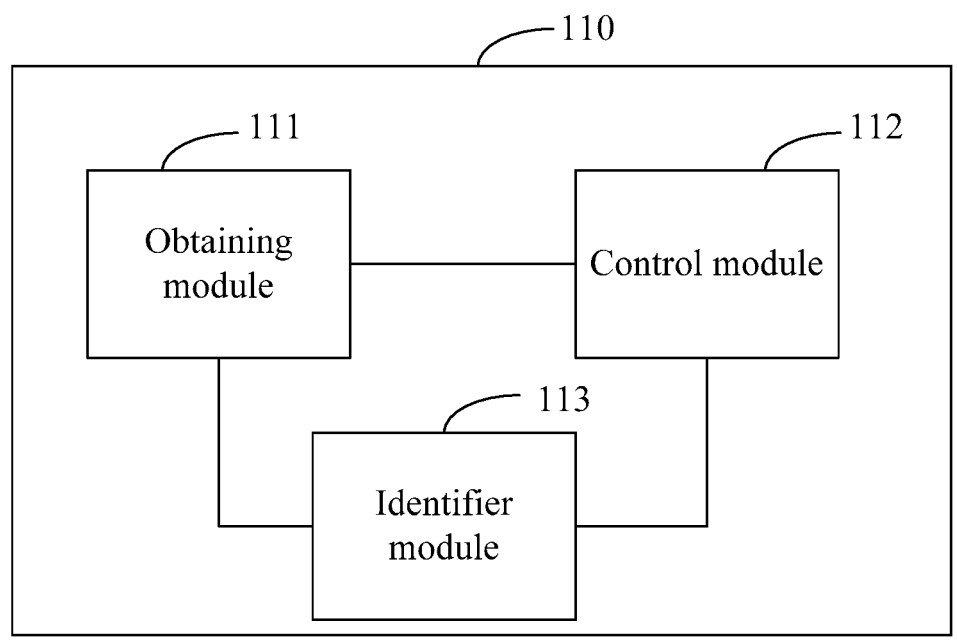
FIG. 11 is a schematic structural diagram of an STA device according to embodiment 11 of the present invention.

FIG. 11 is a schematic structural diagram of an STA device according to embodiment 11 of the present invention. A device in this embodiment may be an STA in MIMO wireless communication. When an access point the AP device sends data or information to the STA device, the method in the foregoing method embodiment is applied. In a practical application, communication peer ends in MIMO may be an AP and an STA, so in different communication cases, a device may be respectively used as an AP or STA. As shown in FIG. 11, the STA device 110 at least includes: an obtaining module 111 and a control module 112, and further may include an identifier module 113.

The obtaining module 111 is configured to obtain a current frame and a preset frame of a current TXOP respectively, in which the current frame includes a subsequent STA indication and a TXOP power save indication, and the preset frame includes an operation object identifier; the obtaining module 111 sends a subsequent STA indication of the current frame of the current TXOP, a TXOP power save indication of the current frame and an operation object identifier of the preset frame to the control module 112.

the control module 112 is configured to, according to the subsequent STA indication of the current frame of the current TXOP, the TXOP power save indication of the current frame and the operation object identifier of the preset frame from the obtaining module 111, control the STA device, and control the STA device to enter a Doze state when the TXOP power save indication of the current frame is allowed, the operation object identifier of the preset frame does not include an indication for this STA device, and the subsequent STA indication of the current frame is that no identifier of a station STA is newly added subsequently.

On the basis of the foregoing technical solutions, the control module 112 is further configured to control the STA device to maintain the Awake state when the TXOP power save indication of the current frame is allowed, the operation object identifier of the preset frame does not include an indication for this STA device, and the subsequent STA indication of the current frame is that an identifier of a station STA is newly added subsequently.

On the basis of the foregoing technical solutions, specifically, the obtaining module 111 specifically may adopt any one of the following three manners, to obtain the subsequent STA indication and the TXOP power save indication. In a first manner, the obtaining module 111 is configured to obtain 1 bit of information denoting the subsequent STA indication and 1 bit of information denoting the TXOP power save indication. Or, in a second manner, the obtaining module 111 is configured to obtain 1 bit of information denoting the subsequent STA indication and obtain that the TXOP power save indication is allowed according to a communication standard. Or, in a third manner, the obtaining module 111 is configured to obtain 1 bit of information denoting the subsequent STA indication and the TXOP power save indication, in which when the subsequent STA indication is that no identifier of a station STA is newly added subsequently and the TXOP power save indication is allowed, the bit is yes, and when the subsequent STA indication is that an identifier of a station STA is newly added subsequently or the TXOP power save indication is forbidden, the bit is no.

On the basis of the foregoing technical solutions, specifically, the obtaining module 111 specifically may adopt any one of the following three manners, to obtain the operation object identifier. In a first manner, the obtaining module 111 is configured to obtain an operation object identifier of the current frame of the current TXOP. Or, in a second manner, the obtaining module 111 is configured to obtain an operation object identifier of one or more frames from the first frame to the current frame of the current TXOP.

On the basis of the foregoing technical solutions, the STA device further may include an identifier module 113. The identifier module 113 is configured to store and update a contained identifier of the STA device. Specifically, the obtaining module 111 obtains the operation object identifier of the preset frame of the current TXOP and sends the operation object identifier to the identifier module 113, the identifier module 113 is configured to judge whether the current contained identifier is yes or no, and if the current contained identifier is yes, the contained identifier is maintained to be yes; if it is no, it is judged whether the operation object identifier of the current frame includes an identifier of this STA device, and if yes, the contained identifier is set to yes; otherwise, the contained identifier is maintained to be no. Correspondingly, the control module 112 is configured to judge whether the contained identifier stored in the identifier module 113 is yes or no, and if the contained identifier is yes, determine that the operation object identifier of the preset frame includes an indication for this STA device, and if the contained identifier is no, determine the operation object identifier of the preset frame does not include the indication for this STA device.

On the basis of the foregoing technical solutions, the obtaining module 111 is further configured to obtain duration information of the current TXOP and send the duration information to the control module 112. Correspondingly, the control module 112 is further configured to control the STA device according to the duration information of the current TXOP from the obtaining module 111, and specifically, when the duration of the current TXOP ends, the control module 112 controls the STA device to enter the Awake state.

The specific working manner of the foregoing modules of the STA device of embodiment 11 of the present invention may be performed by adopting the power save method recorded in embodiment 7 of the present invention to embodiment 10 of the present invention, and the technical solution not detailed in embodiment 11 of the present invention may be implemented with reference to what is recorded in embodiment 7 of the present invention to embodiment 10 of the present invention.

In embodiment 11 of the present invention, the STA device obtains a subsequent STA indication, and controls the STA device to enter the Doze state when the TXOP power save indication is allowed, the subsequent STA indication is that no identifier of a station STA is newly added subsequently and the operation object identifier of the preset frame does not include an identifier of this STA device. Therefore, if the power save method is adopted, the operation object identifier in the first frame of the TXOP is not required to include all STA devices related to the TXOP, thereby expanding the application range of the power save method, and enhancing the power save effect.

It should be noted that, for the method embodiments, for purposes of simplicity of explanation, the method embodiments are described as a combination of a series of actions, but it should be known by persons skilled in the art that the present invention is not limited by the order of the actions, as some steps can, in accordance with the present invention, be performed in other orders or concurrently. Secondly, persons skilled in the art should also know that, the embodiments described in the specification all fall within exemplary embodiments, and the related actions and modules are not necessarily required by the present invention.

A power save method may be given by integrating the foregoing embodiments, which includes the following steps.

S110: Set a power save indication of a current data frame, in which the power save indication is used for indicating that an STA receiving the current data frame is capable of allowing power save.

S1102: Send the current data frame in a current transmit opportunity TXOP, so that the STA receiving the current data frame determines whether to enter a Doze state according to a judgment result for a doze condition, and a power save indication included at least one data frame sent before the current data frame is sent in the TXOP is used for indicating that the STA is forbidden from performing power save.

Apparently, the STA device is an STA device having the function of entering the Doze state.

A specific method for setting a power indication may include the following steps: if a power save indication of a former frame of the current frame indicates that power save is allowed, the power save indication of the current frame is directly set to power save allowed; or if a power save indication of a former frame of the current frame is power save forbidden, it is judged whether the power save indication of the current frame is set to power save allowed according to whether the current TXOP allows power save, and if power save allowed is satisfied, the power save indication of the current frame is set to power save allowed.

Further, the judging whether the power save indication of the current frame is set to power save allowed according to whether the current TXOP allows power save, and if power save is allowed, setting the power save indication of the current frame to power save allowed includes the following steps.

According to whether power save is allowed in the TXOP and whether an identifier of a station STA is newly added in an operation object identifier of a subsequent frame of the current data frame, it is judged whether the power save indication of the current frame is set to power save allowed, and if power save is allowed in the TXOP and no identifier of a station STA is newly added in an operation object identifier of a subsequent frame of the current data frame, the power save indication of the current frame is set to power save allowed.

As an implementation, if the power save indication in the at least one data frame sent before the current data frame is sent in the TXOP is 1, it is indicated that the STA is forbidden from performing power save; if the power save indication of the current frame is 0, it is indicated that the STA receiving the data frame is capable of allowing power save.

Power save indications in all data frames before the current data frame that are sent in the current transmit opportunity TXOP indicate that the STA is forbidden from performing power save, and power save indications in all subsequent data frames of the current data frame indicate that the STA is capable of allowing power save.

In the above embodiments, descriptions for the embodiments have different emphases. For a part not described in detail in some embodiment, references may be made to relevant descriptions in other embodiments.

Persons of ordinary skill in the art may understand that all or part of the steps of the method according to the embodiments may be implemented by a program instructing relevant hardware. The program may be stored in a computer readable storage medium. When the program is executed, the steps of the method according to the embodiments are performed. The storage medium may be any medium that is capable of storing program codes, such as a Read-Only Memory (ROM), a Random Access Memory (RAM), a magnetic disk, or an optical disk.

An access point device is further given, which has a function of entering a Doze state, and includes:

a setting unit, configured to set a power save indication of a current data frame, in which the power save indication is used for indicating that an STA receiving the current data frame is capable of allowing power save; and a sending unit, configured to send the current data frame in a current transmit opportunity TXOP, so that the STA receiving the current data frame determines whether to enter a Doze state according to a judgment result for a doze condition, in which, the setting unit sets the current frame so that a power save indication included at least one data frame sent before the current data frame is sent in the TXOP is used for indicating power save forbidden.

The device may complete the method processes of the foregoing steps S1101 to S1102, and may execute the functions of steps S1101 to S1102.

For example, the setting unit, when setting the power save indication of the current data frame, directly sets the power save indication of the current frame to power save allowed if a power save indication of a former frame of the current frame indicates that power save is allowed; or if a power save indication of a former frame of the current frame is power save forbidden, judges whether the power save indication of the current frame is set to power save allowed according to whether the current TXOP allows power save, and if the current TXOP allows power save, sets the power save indication of the current frame to power save allowed.

Further, the setting unit is configured to set the power save indication to 1 to indicate that the STA is forbidden from performing power save; and set the power save indication to 0, to indicate that the STA receiving the data frame allows power save.

In SU-MIMO mode, the operation object identifier is an association identifier (association identifier, AID for short) of association identifiers of an STA corresponding to the frame, and may be any identifier associated with an STA corresponding to the frame, and if it is the association identifier of the STA, only this STA is indicated; for example, the association identifier of the STA may be an MAC (Medium Access Control) identifier (identifier) of this STA, and the MAC identifier generally is also referred to as an MAC address (address).

Similarly, in MU-MIMO mode, the operation object identifier may be the Group ID as described above, but is not limited to the implementation of adopting the Group ID, and may be any one or multiple identifiers indicating several STAs; for example, in MU-MIMO mode, the operation object identifier further may be implemented by using several MAC addresses corresponding to several STAs respectively, that is, the operation object identifier may also be several MAC addresses corresponding to several STAs respectively.

In embodiment 1 of the present invention to embodiment 4 of the present invention, when setting the TXOP power save indication, the AP may further limit the number of times a value is changed and/or a change form of a value of the TXOP power save indication.

Embodiment 12 is provided.

Step 1201: The AP device sends one or more frames of the current TXOP to the STA device. Each frame includes: an operation object identifier of the frame and a no TXOP power save indication of the frame, and the no TXOP power save indication of each frame is set by the AP according to whether an identifier of a station STA is newly added in an operation object identifier of a subsequent frame of each frame of the current TXOP. Because the no TXOP power save indication is only allowed to change once, and the TXOP power save indication is only allowed to change from the power save forbidden indication to the power save allowed indication, when the no TXOP power save indication changes once and it is assumed that the no TXOP power save indication changes in a $K^{th}$ frame, the implementation manner is that: in all frames between the first frame to a $K-1^{th}$ frame of the current TXOP, including the first frame and the $K-1^{th}$ frame, that is, in all frames of the current TXOP before a frame (that is, a $K^{th}$ frame) where the no TXOP power save indication changes, the AP device sets the value of the no TXOP power save indication to the power save forbidden indication, that is, 1; in all frames between the $K^{th}$ frame to a last frame of the current TXOP, including the $K^{th}$ frame and the last frame, that is, in all frames of the current TXOP before the frame (that is, the $K^{th}$ frame) where the no TXOP power save indication changes and in all frames of the current TXOP after the frame (that is, the $K^{th}$ frame), the AP device sets the value of the no TXOP power save indication to the power save allowed indication, that is, 0.

Step 1202: The STA device obtains a current frame of a current TXOP, in which the current frame includes the no TXOP power save indication of the frame and the operation object identifier of the frame.

Step 1203: The STA device judges whether the no TXOP power save indication of the current frame is yes or no, if it is no, step 1204 is executed; if it is yes, the STA device maintains the Awake state, and the STA device uses a next frame as a new current frame, and returns to step 1202.

Step 1204: In each frame from the current frame to a last frame of the current TXOP, the STA device judges whether a first doze condition is satisfied, and if yes, the STA device enters the Doze state; if no, the STA device maintains the Awake state. In this step, it is not required that doze conditions in existing communication protocol are modified according to the first doze condition, thereby upgrading and reconstructing an existing communication device more conveniently.

As described in embodiment 4, in MU-MIMO mode, the second doze condition may include a combination of one or both of the two conditions, and in SU-MIMO mode, the second doze condition may include a combination of one or both of the two conditions. The implementation of implementation 1 of embodiment 4 may be that: in MU-MIMO mode, the second doze condition includes a last one of the two conditions, and in SU-MIMO mode, the second doze condition includes a last one of the two conditions, that is, in the MU-MIMO mode and the SU-MIMO mode, the second doze condition is that: an operation object identifier of a current frame includes an indication for this STA device, and this STA receives more data frames whose data bit indications are 0, which is equivalent to that, the second doze condition is that this STA device receives more data frames whose data bit indications are 0 which are sent to this STA device, and replies to the data frame with a corresponding ACK. The implementation of implementation 2 of embodiment 4 may be that: in MU-MIMO mode, the second doze condition includes the two conditions, and in SU-MIMO mode, the second doze condition includes a last one of the two conditions, which is equivalent to that, in the second doze condition adopted in implementation 1 of the foregoing embodiment 4, the first condition in the MU-MIMO mode is added, so that the second doze condition in the MU-MIMO mode and the SU-MIMO mode may comprehensively denote that the following condition 1 and condition 2 are included.

Condition 1: A group identity (that is, Group ID) of a current frame includes an indication for this STA device, and an indication of a spatial multiplexing stream number corresponding to this STA is 0.

Condition 2: An operation object identifier of a current frame includes an indication for this STA device, and this STA receives more data frames whose data bit indications are 0, which is equivalent to that, this STA device receives more data frames whose data bit indications are 0 which are sent to this STA device, and replies to the data frame with a corresponding ACK.

A more detailed implementation method of the power save method of the foregoing embodiment 12 is as follows, and is recorded as embodiment 13.

Step 1301: The AP device sends one or more frames of the current TXOP to the STA device. Each frame includes: an operation object identifier of the frame and a no TXOP power save indication of the frame, and the no TXOP power save indication of each frame is set by the AP according to whether an identifier of a station STA is newly added in an operation object identifier of a subsequent frame of each frame of the current TXOP. When the no TXOP power save indication changes once and it is assumed that the no TXOP power save indication changes in the $K^{th}$ frame, the implementation manner is that: in all frames between the first frame to a $K-1^{th}$ frame of the current TXOP, including the first frame and the $K-1^{th}$ frame, that is, in all frames of the current TXOP before a frame (that is, a $K^{th}$ frame) where the no TXOP power save indication changes, the AP device sets the value of the no TXOP power save indication to the power save forbidden indication, that is, 1; in all frames between the $K^{th}$ frame to a last frame of the current TXOP, including the $K^{th}$ frame and the last frame, that is, in all frames of the current TXOP before the frame (that is, the $K^{th}$ frame) where the no TXOP power save indication changes and in all frames of the current TXOP after the frame (that is, the $K^t$ frame), the AP device sets the value of the no TXOP power save indication to the power save allowed indication, that is, 0.

In the same TXOP, the TXOP power save indication of each frame is set by the AP according to whether power save is allowed in the current TXOP and whether an STA having the function of entering the Doze state is newly added in the operation object identifier of the subsequent frame of the frame. Specifically, the AP may adopt the foregoing second method to judge whether an STA having the function of entering the Doze state is newly added in the operation object identifier of the subsequent frame of each frame of the current TXOP, that is, it is judged whether the operation object identifier of the current frame indicates an STA device having the function of entering the Doze state and required to transfer data in all frames after the current frame in the current TXOP, and if yes, it indicates that no data is transferred to a new STA device in each of subsequent frames of the current frame, the condition that no identifier of a station STA is newly added subsequently is satisfied in the current frame; otherwise, the condition that no identifier of a station STA is newly added subsequently is unsatisfied in the current frame. It can be seen easily that, the foregoing condition that no identifier of a station STA is newly added subsequently is satisfied in the current frame, which is equivalent to that: in the current TXOP, in each of subsequent frames of the current frame, the STA device having the function of entering the Doze state to which the AP transfers data may be one of several STA devices that are indicated by the operation object identifier of the current frame.

In this embodiment, the method for setting the TXOP power save indication is comprehensively described as follows: if a TXOP power save indication of a former frame of the current frame is set to power save allowed, the TXOP power save indication of the current frame may be set to power save allowed; if a TXOP power save indication of a former frame of the current frame is set to power save forbidden, the TXOP power save indication of the current frame may be set to power save allowed or power save forbidden. When the TXOP power save indication of the current frame may be set to power save allowed or power save forbidden, only when power save being allowed in the current TXOP and no STA being newly added subsequently are both satisfied, the TXOP power save indication of the current frame of the current TXOP may be set to power save allowed. If power save is not allowed in the current TXOP, the TXOP power save indication of the current frame of the current TXOP may be set to power save forbidden.

Step 1302: The STA device obtains a current frame of a current TXOP, in which the current frame includes the no TXOP power save indication of the frame and the operation object identifier of the frame.

Step 1303: The STA device judges whether the no TXOP power save indication of the current frame is yes or no, if it is no, step 1304 is executed; if it is yes, the STA device maintains the Awake state, and correspondingly is not required to judge whether the doze condition is satisfied, and the STA device uses a next frame as a new current frame, and returns to step 1302.

Step 1304: In each frame from the current frame to a last frame of the current TXOP, that is, in a frame where the no TXOP power save indication in the current TXOP is no, the STA device judges whether a third doze condition is satisfied, and if yes, the STA device may enter the Doze state; if no, the STA device maintains the Awake state. Several STA devices once receiving a data frame sent to themselves in each frame where the value of the no TXOP power save indication is the power save forbidden indication judge whether a third doze condition is satisfied, and if yes, the STA device enters the Doze state; if no, the STA device maintains the Awake state. The third doze condition may include any one or any combination of the following four conditions, and when one of the conditions is satisfied, that is, judging that the third doze condition is satisfied, the STA device may enter the Doze state; when one or more conditions included by the third doze condition is unsatisfied, judging that the third doze condition is unsatisfied, the STA device maintains an Awake state. The four conditions specifically may include the following content.

Condition 1: A group identity (that is, Group ID) of the current frame does not include the indication for this STA device.

Condition 2: The partial AID indicated in the operation object identifier of the current frame is different from the partial AID of this STA device, or the current frame is not sent to this STA.

Condition 3: A group identity (that is, Group ID) of a current frame includes an indication for this STA device, and an indication of a spatial multiplexing stream number corresponding to this STA is 0.

Condition 4: this STA device receives more data frames whose data bit indications are 0 which are sent to this STA device, and replies to the data frame with a corresponding ACK.

The power save method of the foregoing embodiment 13 may be further optimized, so as to acquire embodiment 14.

Step 1401: The AP device sends one or more frames of the current TXOP to the STA device. Each frame includes: an operation object identifier of the frame and a no TXOP power save indication of the frame, and the no TXOP power save indication of each frame is set by the AP according to whether an identifier of a station STA is newly added in an operation object identifier of a subsequent frame of each frame of the current TXOP. When the no TXOP power save indication changes once and it is assumed that the no TXOP power save indication changes in the $K^{th}$ frame, the implementation manner is that: in all frames between the first frame to a K-$1^{th}$ frame of the current TXOP, including the first frame and the K-$1^{th}$ frame, that is, in all frames of the current TXOP before a frame (that is, a $K^{th}$ frame) where the no TXOP power save indication changes, the AP device sets the value of the no TXOP power save indication to the power save forbidden indication, that is, 1; in all frames between the $K^{th}$ frame to a last frame of the current TXOP, including the $K^{th}$ frame and the last frame, that is, in all frames of the current TXOP before the frame (that is, the $K^{th}$ frame) where the no TXOP power save indication changes and in all frames of the current TXOP after the frame (that is, the $K^{th}$ frame), the AP device sets the value of the no TXOP power save indication to the power save allowed indication, that is, 0.

In the same TXOP, the TXOP power save indication of each frame is set by the AP according to whether power save is allowed in the current TXOP, the foregoing limitations i and ii, and whether an STA having the function of entering the Doze state is newly added in the operation object identifier of the subsequent frame of the frame. The method in which the AP judges whether an STA having the function of entering the Doze state is newly added in the operation object identifier of the subsequent frame of each frame of the current TXOP includes: judging whether several STA devices that are indicated by the operation object identifier of the current frame and several STA devices to which the AP once transfers data in each frame before the current frame include the STA device having the function of entering the Doze state and required to transfer data in all frames after the current frame in the current TXOP, and if yes, it indicates that no data is transferred to a new STA device in each of subsequent frames of the current frame, the condition that no identifier of a station STA is newly added subsequently is satisfied in the current frame; otherwise, the condition that no identifier of a station STA is newly added subsequently is unsatisfied in the current frame. It can be seen easily that, the foregoing condition that no identifier of a station STA is newly added subsequently is satisfied in the current frame, which is equivalent to that: in the current TXOP, in each of subsequent frames of the current frame, the STA device having the function of entering the Doze state to which the AP transfers data may be one of several STA devices that are indicated by the operation object identifier of the current frame, or is an STA device of the several STA devices to which the AP once transfers data in each frame before the current frame.

In this embodiment, the method for setting the TXOP power save indication is comprehensively described as follows: according to the foregoing limitations i and ii, if a TXOP power save indication of a former frame of the current frame is set to power save allowed, the TXOP power save indication of the current frame may be set to power save allowed; if a TXOP power save indication of a former frame of the current frame is set to power save forbidden, the TXOP power save indication of the current frame may be set to power save allowed or power save forbidden. When according to the foregoing limitations i and ii, the TXOP power save indication of the current frame may be set to power save allowed or power save forbidden, only when power save being allowed in the current TXOP and no STA being newly added subsequently are both satisfied, the TXOP power save indication of the current frame of the current TXOP may be set to power save allowed. If power save is not allowed in the current TXOP, the TXOP power save indication of the current frame of the current TXOP may be set to power save forbidden.

Step 1402: The STA device obtains a current frame of a current TXOP, in which the current frame includes the no TXOP power save indication of the frame and the operation object identifier of the frame.

Step 1403: The STA device judges whether the no TXOP power save indication of the current frame is yes or no, if it is no, step 1404 is executed; if it is yes, the STA device maintains the Awake state, and correspondingly is not required to judge whether the doze condition is satisfied, and the STA device uses a next frame as a new current frame, and returns to step 1402. Moreover, the STA device further performs the following operations: judging whether the AP transfers data to itself in the current frame, that is, judging whether the AP sends an MAC address (or referred to as an MAC identifier) of a receiving end and a data frame the same as an MAC address of this STA device to this STA device in the current frame, and if yes, the STA device records this state, that is, records this state that a data frame sent to itself is once received in a frame where the value of the no TXOP power save indication is the power save forbidden indication.

Step 1404: In each frame from the current frame to a last frame of the current TXOP, that is, in a frame where the no TXOP power save indication in the current TXOP is no, several STA devices once receiving a data frame sent to themselves in each frame where the value of the no TXOP power save indication is the power save forbidden indication judge whether a fourth doze condition is satisfied, and if yes, the STA devices may enter the Doze state; if no, the STA devices maintain the Awake state. However, other STA devices instead of the several STA devices once receiving a data frame sent to themselves in each frame where the value of the no TXOP power save indication is the power save forbidden indication, that is, STA devices not ever receiving a data frame sent to themselves in each frame where the value of the no TXOP power save indication is the power save forbidden indication, judge whether the third doze condition is satisfied, and if yes, the STA devices enter the Doze state; if no, the STA devices maintain the Awake state. The fourth the doze condition, that is, a last condition of the four conditions included by the third doze condition, is that: this STA device receives more data frames whose data bit indications are 0 which are sent to this STA device, and replies to the data frame with a corresponding ACK.

In step 1404, the several STA devices once receiving a data frame sent to themselves in each frame where the value of the no TXOP power save indication is the power save forbidden indication adopt the fourth doze condition.

In embodiment 14, step 1404 may be modified only to acquire still another embodiment of the present invention, that is: the fourth doze condition in step 1404 is replaced with a fifth doze condition, that is, several STA devices once receiving a data frame sent to themselves in each frame where the value of the no TXOP power save indication is the power save forbidden indication judge whether the fifth doze condition is satisfied, and if yes, the STA devices enter the Doze state; if no, the STA devices maintain the Awake state. However, the fifth doze condition may include any one or any combination of the following two conditions, and when one of the conditions is satisfied, that is, judging that the fifth doze condition is satisfied, the STA device may enter the Doze state; when one or more conditions included by the fifth doze condition is unsatisfied, judging that the fifth doze condition is unsatisfied, the STA device maintains an Awake state. However, the two conditions, that is, last two conditions of the four conditions included by the third doze condition, are: condition 1: a group identity (that is, Group ID) of a current frame includes an indication for this STA device, and an indication of a spatial multiplexing stream number corresponding to this STA is 0; and condition 2: this STA device receives more data frames whose data bit indications are 0 which are sent to this STA device, and replies to the data frame with a corresponding ACK.

In the embodiments of this application document, if an STA device judges the STA device itself may enter the Doze state according to the doze condition, the STA device maintains the Doze state until this TXOP ends. When a TXOP begins, an NAV (network allocation vector: network allocation vector) is carried in at least one frame sent by an AP, the NAV indicates a period of time, and in this period of time, all STAs having no control right over the TXOP are incapable of actively initiating data transmission; thereby, the NAV sets TXOP continuation time, and in practice, when a TXOP begins, the TXOP continuation time set by the AP may change in the TXOP, and may be implemented through a frame carrying a new NAV and sent by the AP; the TXOP end time indicated by the new NAV is different from the TXOP end time set by the NAV sent by the AP previously. In the prior art, the foregoing carrying an NAV in a frame generally refers to carrying an NAV in a duration field (Duration field) in an MAC frame (MAC frame) in a frame.

In the embodiments of this application document, the following step 1501 may be added for each STA device, so as to avoid that the STA device occupies a wireless channel after being switched to the Awake state so as to disturb communication being performed by other users.

Step 1501: Any STA device maintaining the Doze state until the end of this TXOP, after ending the Doze state and being switched to the Awake state, is incapable of using a transmission medium (access the medium), that is, is incapable of occupying a wireless channel to send information, until any one or more of the following three conditions is satisfied. Condition 1. The STA device receives a frame and the frame sets its own NAV.

Condition 2. The STA device correctly decodes an L-SIG field (that is, Non-HT Signal field, also referred to as Legacy Signal field) included by a frame and the frame supports a mechanism that the L-SIG protects the TXOP (that is, L-SIG TXOP protection). Condition 3. by performing CCA (clear channel assessment, that is, a channel does not use state assessment), the STA device determines that in a period of given time T15, a channel, that is, a transmission medium, is in an idle (idle) state. The T15 is a length value of a period of time, for example, may be 0.5 millisecond or 0.9 millisecond; the CCA is an existing technology, that is, the STA device accesses power received on a channel, and when the power is less than a given value, it is considered that the channel is in the idle state.

Another implementation manner may further exist for condition 2 of the foregoing step 1501, in which the STA device correctly decodes an L-SIG field included by a frame; and when the frame does not support the mechanism that the L-SIG supports the TXOP, and only after a period of time protected by the L-SIG field ends and then a period of given time T2 passes, the STA device may use a transmission medium; however, when the frame supports the mechanism that the L-SIG protects the TXOP, and after the period of time protected by the L-SIG field ends, the STA device may use a transmission medium. That the STA device may use a transmission medium does not mean that the STA device definitely uses a transmission medium. When an STA device may use a transmission medium, generally the STA device further needs to compete for the use right of the transmission medium, and only after obtaining the use right of the transmission medium through competition, the STA device uses the transmission medium; multiple implementation manners may exist for the value of the period of given time T15*b*, and for example, T15*b* is equal to the time length of an ACK frame plus the time length of two SIFSs (short inter-frame space: short inter-frame space), or is equal to the time length of an ACK frame plus the time length of an SIFS then plus the time length of a PIFS (The PCF inter-frame space: PCF inter-frame space).

It can be seen from the foregoing step 1501 that, after ending the Doze state and being switched to the Awake state, if an STA device maintaining the Doze state until the end of this TXOP can immediately receive a frame and the frame sets its own NAV, the STA device may use a transmission medium very quickly.

Therefore, the following steps may be added for the AP device and the AP device sends a frame after the end of the TXOP to enable the STA device switched to the Awake state to set the NAV, and the specific method is as follows.

Step 1601: After this TXOP ends and a T16 time interval passes, the AP device sends a frame to each STA device, and the frame carries an NAV. The T16 time interval has multiple possible implementation manners, which for example, may be the SIFS or PIFS; the value of the NAV carried by the frame has multiple possible implementation manners, which for example, may be a zero value or only perform protection until the time when the frame ends; the frame has multiple possible implementation manners, which for example, may be a CF_End frame in the prior art, and the value of the NAV carried by the CF_End frame is a zero value; the moment occurring after this TXOP ends and a T16 time interval passes is a moment which is after the time when this TXOP ends, and the time interval between the moment and the time when this TXOP ends is T16.

Step 1602: After ending the Doze state and being switched to the Awake state, each STA device maintaining the Doze state until this TXOP ends receives a frame sent by the AP device after this TXOP ends and then a T16 time interval passes, and the frame sets its own NAV, thereby conforming to the condition 1 in step 1501; correspondingly after the frame ends, a transmission medium may be used. Particularly, when a frame sent by the AP device in step 1601 is a CF_End frame, each STA device understands the CF_End frame being received as an NAV being reset, that is, at the time when the foregoing CF_End frame ends, each STA device resets its own NAV timer to zero.

In the foregoing steps 1601 and 1602, the CF_End frame may be adopted only for implementation, and the SIFS may be specified to be used for the T16 time interval, and corresponding steps are as follows:

Step 1701: After this TXOP ends and an SIFS time interval passes, the AP device sends a CF_End frame to each STA device, and the value of the NAV carried in the CF_End frame is a zero value.

Step 1702: After ending the Doze state and being switched to the Awake state, each STA device maintaining the Doze state until this TXOP ends receives a CF_End frame sent by the AP device after this TXOP ends and then an SIFS time interval passes, and the CF_End frame being received is understood as the NAV being reset, that is, at the time when the foregoing CF_End frame ends, each the STA device resets its own NAV timer to zero; correspondingly, a transmission medium may be used.

In the foregoing embodiments, after entering a Doze state, an STA device maintains the Doze state until this TXOP ends. However, the embodiments of the present invention are not limited to the foregoing implementation manners; for example, if an STA device judges the STA device itself may enter the Doze state according to the doze condition, the STA device maintains the Doze state until this TXOP ends; meanwhile, in a duration during which the STA device maintains the Doze state, at several moments specified in advance, the STA device wakes up and maintains the Awake state in a period of time, and then enters the Doze state again; or, if an STA device judges the STA device itself may enter the Doze state according to the doze condition, the STA device maintains the Doze state until a moment before the end of this TXOP.

An embodiment is further provided as follows, and is recorded as embodiment 18.

Step 1801: In a current TXOP, each STA device judges whether the STA device itself may enter a Doze state. If an STA device judges that the STA device itself may enter the Doze state, the STA device maintains the Doze state until a moment before the time when this TXOP ends, and is switched to the Awake state at the moment. A time interval between the time when the STA device ends the Doze state and is switched to the Awake state and the time when this TXOP ends is equal to a value stipulated in advance by parties participating in communication, or is within a range stipulated in advance by parties participating in communication. After being switched to the Awake state, the STA device receives a frame sent by the AP, then updates its own NAV setting according to the NAV carried by the frame sent by the AP, or updates it own NAV setting according to the L-SIG field of the frame sent by the AP, or determines whether the time when this TXOP ends is the same as the end time of this TXOP set by the AP at the beginning of the TXOP according to at least one bit carried by the frame sent by the AP.

Within a time range between the time when the STA ends the Doze state and is switched to the Awake state in step 1801 and the end time of this TXOP, or within a time range after the time when the STA ends the Doze state and is switched to the Awake state in step 1801 and a T18 time interval, or within a time range before the time when this TXOP ends, the AP device sends at least one frame to several STA devices, the frame carries an NAV to indicate the time when the TXOP ends, or the L-SIG field of the frame carries a time indication provided for the STA device to update its own NAV setting, or the frame carries at least one bit used to indicate whether the time when this TXOP ends is the same as the end time of this TXOP set by the AP at the beginning of the TXOP. The T18 time interval of this step has multiple possible implementation manners, which for example, may be the SIFS or PIFS.

In the foregoing embodiment 18, further, at least one frame sent by the AP device within the time range to several STA devices must satisfy at least one of the following four features: at least one frame sent by the AP device within the time range to several STA devices is not sent in a beamforming (beamforming) manner; an NAV carried in at least one frame sent by the AP device within the time range to several STA devices is not sent in a beamforming manner; in at least one frame sent by the AP device within the time range to several STA devices, an L-SIG field of the frame is not sent in a beamforming manner; in at least one frame sent by the AP device within the time range to several STA devices, at least one bit carried by the frame used to indicate whether the time when this TXOP ends is the same as the end time of this TXOP set by an AP at beginning of the TXOP is not sent in a beamforming manner.

What is claimed is:

1. A power save method, comprising:
    sending, by an access point (AP), multiple frames of a current transmit opportunity (TXOP) to a station (STA), wherein each frame comprises a TXOP power save indication, the TXOP power save indication of each frame is a B22 bit in a very high throughput signal A1 (VHT-SIG-A1) field of each frame; and in a same TXOP, a value of the TXOP power save indication of the multiple frames is only allowed to change once;
    wherein that in the same TXOP, the value of the TXOP power save indication of the multiple frames is only allowed to change once comprises at least one of:

when a TXOP power save indication of a previous frame is power save forbidden, a TXOP power save indication of a current frame is allowed to be set to power save allowed;

and when the TXOP power save indication of the previous frame is power save allowed, the TXOP power save indication of the current frame is disallowed to be set to power save forbidden.

2. The method according to claim 1, wherein the value of the TXOP power save indication of the multiple frames is only allowed to change from a power save forbidden indication to a power save allowed indication in the same TXOP.

3. The method according to claim 1, wherein the TXOP power save indication is a No TXOP power save indication.

4. A power save method, comprising:
receiving, by a station (STA), multiple frames of a current transmit opportunity (TXOP) from an access point (AP); and
when a TXOP power save indication of a current frame is power save allowed, determining, by the STA device, whether to enter a doze state according to a judgment result for a doze condition, wherein each frame comprises a TXOP power save indication, the TXOP power save indication of each frame is a B22 bit in a very high throughput signal A1 (VHT-SIG-A1) field of each frame;
wherein, in a same TXOP, a value of the TXOP power save indication of the multiple frames is only allowed to change once;
wherein that in the same TXOP, the value of the TXOP power save indication of the multiple frames is only allowed to change once comprises at least one of:
when a TXOP power save indication of a previous frame is power save forbidden, the TXOP power save indication of the current frame is allowed to be set to power save allowed;
and
when the TXOP power save indication of the previous frame is power save allowed, the TXOP power save indication of the current frame is disallowed to be set to power save forbidden.

5. The method according to claim 4, wherein the value of the TXOP power save indication of the multiple frames is only allowed to change from a power save forbidden indication to a power save allowed indication in the same TXOP.

6. The method according to claim 4, wherein the TXOP power save indication is a No TXOP power save indication.

7. An access point (AP) device, comprising:
a processor, configured to set a transmit opportunity (TXOP) power save indication of each of multiple frames of a current TXOP, wherein in a same TXOP, a value of the TXOP power save indication of the multiple frames is only allowed to change once; and
a transmitter, configured to send the multiple frames to a station (STA), wherein each frame comprises the TXOP power save indication, the TXOP power save indication of each frame is a B22 bit in a very high throughput signal A1 (VHT-SIG-A1) field of each frame;
wherein that in the same TXOP, the value of the TXOP power save indication of the multiple frames is only allowed to change once comprises at least one of:
when a TXOP power save indication of a previous frame is power save forbidden, a TXOP power save indication of a current frame is allowed to be set to power save allowed;
and
when the TXOP power save indication of the previous frame is power save allowed, the TXOP power save indication of the current frame is disallowed to be set to power save forbidden.

8. The device according to claim 7, wherein
the value of the TXOP power save indication of the multiple frames is only allowed to change from a power save forbidden indication to a power save allowed indication in the same TXOP.

9. The device according to claim 7, wherein the TXOP power save indication is a No TXOP power save indication.

10. A station (STA) device, comprising:
a receiver, configured to receive multiple frames of a current transmit opportunity (TXOP) from an access point (AP), wherein each frame comprises a TXOP power save indication, the TXOP power save indication of each frame is a B22 bit in a very high throughput signal A1 (VI-IT-SIG-A1) field of each frame; and in a same TXOP, a value of the TXOP power save indication of the multiple frames is only allowed to change once; and
a processor, configured to: when a TXOP power save indication of a current frame is power save allowed, determine whether to enter a doze state according to a judgment result for a doze condition;
wherein that in the same TXOP, the value of the TXOP power save indication of the multiple frames is only allowed to change once comprises at least one of:
when a TXOP power save indication of a previous frame is power save forbidden, the TXOP power save indication of the current frame is allowed to be set to power save allowed;
and
when the TXOP power save indication of the previous frame is power save allowed, the TXOP power save indication of the current frame is disallowed to be set to power save forbidden.

11. The device according to claim 10, wherein
the value of the TXOP power save indication of the multiple frames is only allowed to change from a power save forbidden indication to a power save allowed indication in the same TXOP.

12. The device according to claim 10, wherein the TXOP power save indication is a No TXOP power save indication.

* * * * *

UNITED STATES PATENT AND TRADEMARK OFFICE
CERTIFICATE OF CORRECTION

PATENT NO. : 9,736,776 B2
APPLICATION NO. : 15/066939
DATED : August 15, 2017
INVENTOR(S) : Zhu et al.

Page 1 of 1

It is certified that error appears in the above-identified patent and that said Letters Patent is hereby corrected as shown below:

Column 44, Line 29, Claim 10 "(VI-IT-SIG-A1)" should read -- "(VHT-SIG-A1)" --.

Signed and Sealed this
Twenty-seventh Day of March, 2018

Andrei Iancu
*Director of the United States Patent and Trademark Office*